Figure 1:
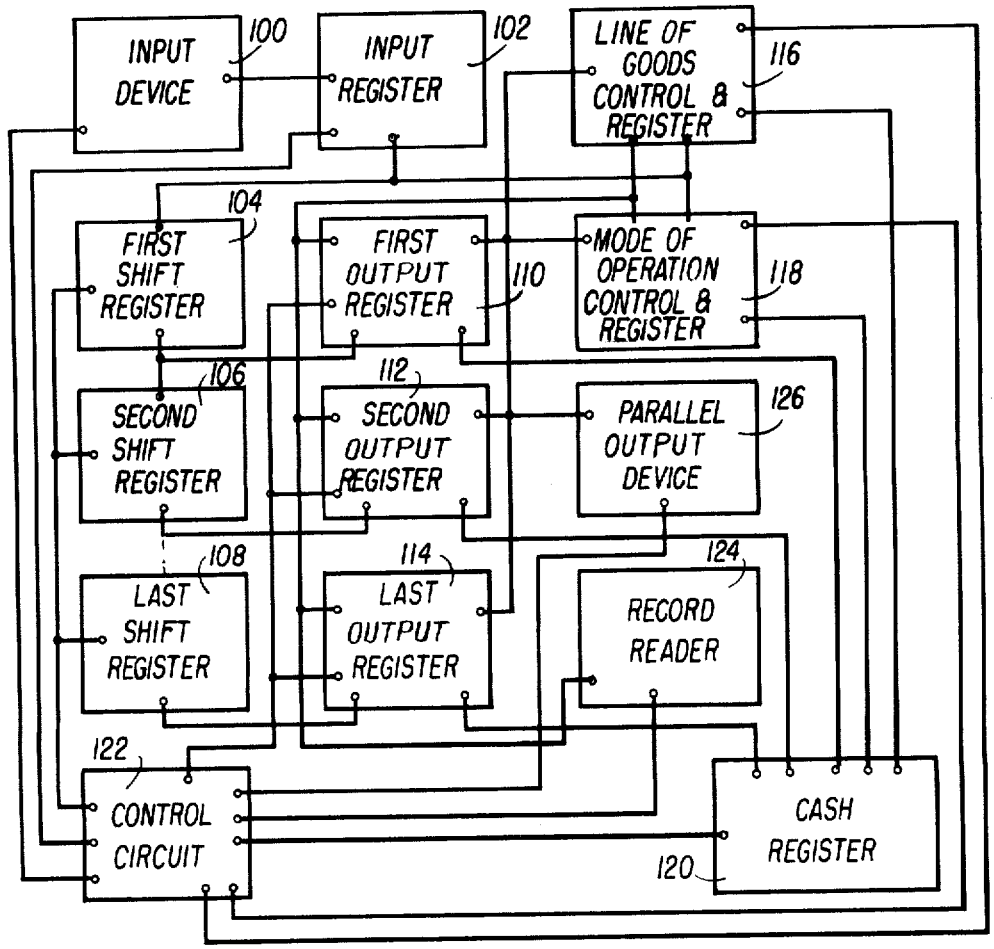

March 15, 1966 G. E. SUNDBLAD 3,240,921
DATA HANDLING SYSTEM

Filed July 6, 1959 9 Sheets-Sheet 1

INVENTOR.
GUNNAR E. SUNDBLAD
BY
ATTYS.

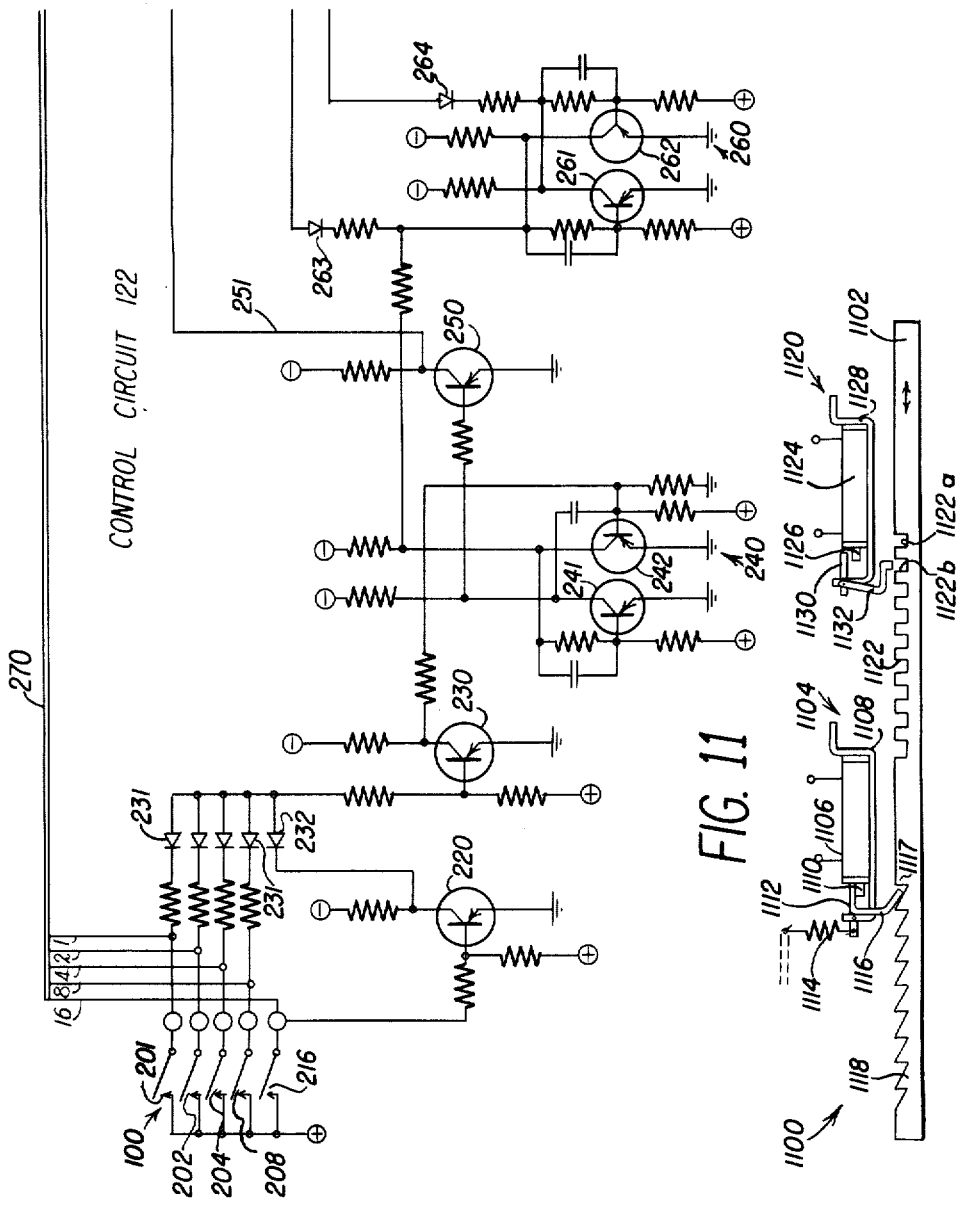

INVENTOR.
GUNNAR E. SUNDBLAD
BY
ATTYS.

March 15, 1966 G. E. SUNDBLAD 3,240,921
DATA HANDLING SYSTEM
Filed July 6, 1959 9 Sheets-Sheet 9

INVENTOR.
GUNNAR E. SUNDBLAD
BY
ATTYS.

United States Patent Office 3,240,921
Patented Mar. 15, 1966

3,240,921
DATA HANDLING SYSTEM
Gunnar E. Sundblad, Bromma, Sweden, assignor to Svenska Data-Register AB, Stockholm, Sweden, a corporation of Sweden
Filed July 6, 1959, Ser. No. 825,177
25 Claims. (Cl. 235—156)

This invention relates to a data handling system and, more particularly, to a system including new and improved means for storing, translating, transferring, and utilizing digital data.

In certain types of accounting and computing equipment or business machines, it is desirable to provide a control unit which requires a small number of operable elements and which is capable not only of entering the necessary digital data, but also of controlling the performance of diverse operations of the data handling equipment. In the copending application of Sture A. Werner, Serial No. 701,283, filed December 3, 1957, now Patent No. 3,034,717, there is disclosed a data handling system in which a portable device having five manually actuated keys controls the entrance of digits into and the performance of various operations by a cash register. In certain applications, it would be desirable to increase the operating speed of this prior type of system and to extend the diversity of the control functions that can be performed thereby.

Accordingly, one object of the present invention is to provide a new and improved data handling system.

Another object is to provide new and improved means for entering and storing digital data.

A further object is to provide a novel system for automatically supplying digital and control information to a cash register.

Another object is to provide new and improved means for automatically controlling the differential positioning of mechanically settable digit representing elements in a data handling mechanism.

Another object is to provide a data handling system including new and improved means for selectively clearing and transferring digital data between a plurality of registers.

Another object is to provide a data handling system in which a digital entry is automatically stored in a selected one of a plurality of register means in accordance with the value of the entry.

Another object is to provide a data handling system in which the performance of a resetting operation in which a plurality of digit registers are cleared is controlled in accordance with the values of successive digital entries.

A still further object is to provide a data handling system in which a digital entry stored in one storage register is selectively transferred to either a second storage register or to a readout register in accordance with the value of a subsequent digital entry.

Another object is to provide new and improved binary code controlled means for entering control and digital data into a decimal cash register.

A further object is to provide new and improved means for controlling the mode of operation of an accounting machine by the use of digital signals.

Another object is to provide a novel data handling system using a five digit binary code for controlling all of the operations of a cash register.

A further object is to provide new and improved means for reading data out of an accounting machine.

Another object of this invention is to provide a data handling system in which a common group of electronic registers are digitally controlled to selectively transfer data to or remove data from a cash register.

In accordance with these and many other objects, an embodiment of the invention comprises a cash register including a plurality of mechanically movable elements or slides which are adjusted to different settings to cause the entry of digital information and to cause the cash register to perform various control functions. The positioning of the slides is controlled by a data handling system which is connected between the cash register and an input device, such as a key controlled mechanism. The data handling system includes an input register which is connected to and controlled by the input device and which is adapted to provide a temporary or intermediate storage for successive digital entries. If the value of an entry received from the input device is in a first range representing digits of an amount that is to be entered into the cash register, the input register transfers each of the digits in succession to a plurality of shift registers. In operation, the first such digit is transferred from the input register to the first shift register so that, when a second digit is received from the input device, the previously stored digit is shifted to a second shift register and the second digit is transmitted to the first shift register from the input register. This shifting storage of the digits continues for so long as entries in the first range of values are received from the input device.

When the digits or the amount stored in the shift registers is to be transferred to the cash register, a digital entry in a second range of values representing the line of goods corresponding to the stored amount, such as meat, grocery, tax, etc., is supplied to the input register. In response to the storage of an entry of this type in the input register, the line of goods entry is transferred to a separate line of goods register, a mode of operation register is automatically operated to a setting representing a listing operation, and the digits stored in the plurality of shift register are transferred to a corresponding number of readout registers. The line of goods register, the mode of operation register, and the plurality of readout registers are connected to control means in the cash register which are associated with the mechanically settable slides. The receipt of the digital entry representing the line of goods places the cash register in operation so that certain of the slides are first mechanically moved toward settings representing the information stored in the line of goods register and the mode of operation register and others of the slides are then moved to settings determined by the readout registers. As the slides reach settings corresponding to the information stored in the associated registers, the register return stop signals to the cash register which arrest further movement of the slides. At the completion of this cycle of operation, all of the mechanically settable elements or slides are differentially positioned in accordance with the values of the digits stored in the readout registers and the control information stored in the line of goods register and the mode of operation register. Thus, the successively entered items of information supplied to the input register from the input device have been automatically transmitted to the cash register and this information is handled by the cash register in the manner represented by the received mode of operation.

If a second identical amount, such as the cost of an item, is to be entered into the cash register a second time, the input device is next operated to again transfer a digital entry to the input register representing the line of goods. This causes the line of goods entry to be stored in the line of goods register, the listing operation to be stored in the mode of operation register, and the values previously stored in the shift registers to be again transferred to the readout registers which were cleared during the transfer of the preceding information to the cash register. This identical group of digits or amount is then transferred to the cash register in the manner described above.

When the next amount is to be entered into the cash register, the first digit of this amount supplied from the input device to the input register operates a control circuit so that the values previously standing in the shift registers are cleared. The first entered digit is then transferred from the input register to the first shift register. The resetting or clearing operation is automatically performed whenever the input register is provided with a digital entry which falls in the first predetermined range and which has been preceded by an entry that is not included in this first range. The remaining items of information are then accumulated in the shift registers and transferred through the readout registers to the cash register in the manner described above.

Whenever the cash register is to be operated to perform a specific function, such as the determination of a total or subtotal, a digital entry having a value in a third range is supplied by the input device to the input register. The input register transfers this digital entry to the mode of operation register and prevents the transfer of this information to either the shift registers or the line of goods register. In response to the storage of this information, the mode of operation register controls the positioning of a mode of operation selecting slide in the cash register in the manner described above. If the mode of operation slide is set to a subtotal or total position, the slides associated with the readout or amount registers are moved through distances proportional to the value standing in the listing accumulator so that signals are supplied to the readout registers representing the amount stored in the listing accumulator. These signals operate the readout registers to manifestations of the true value of the accumulated sum in the cash register. These registers then control an output recorder to provide a record of the total or subtotal read out of the cash register. The data handling system also includes means controlled by a particular digital entry for resetting the system to a normal condition. This permits the registers to be cleared at any time.

Figure 10:
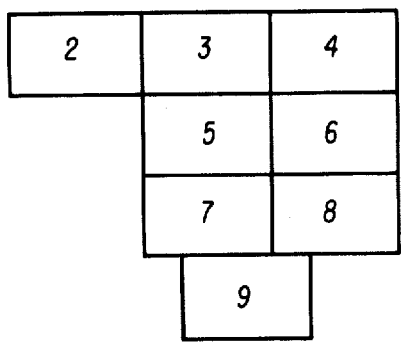
Figure 3:
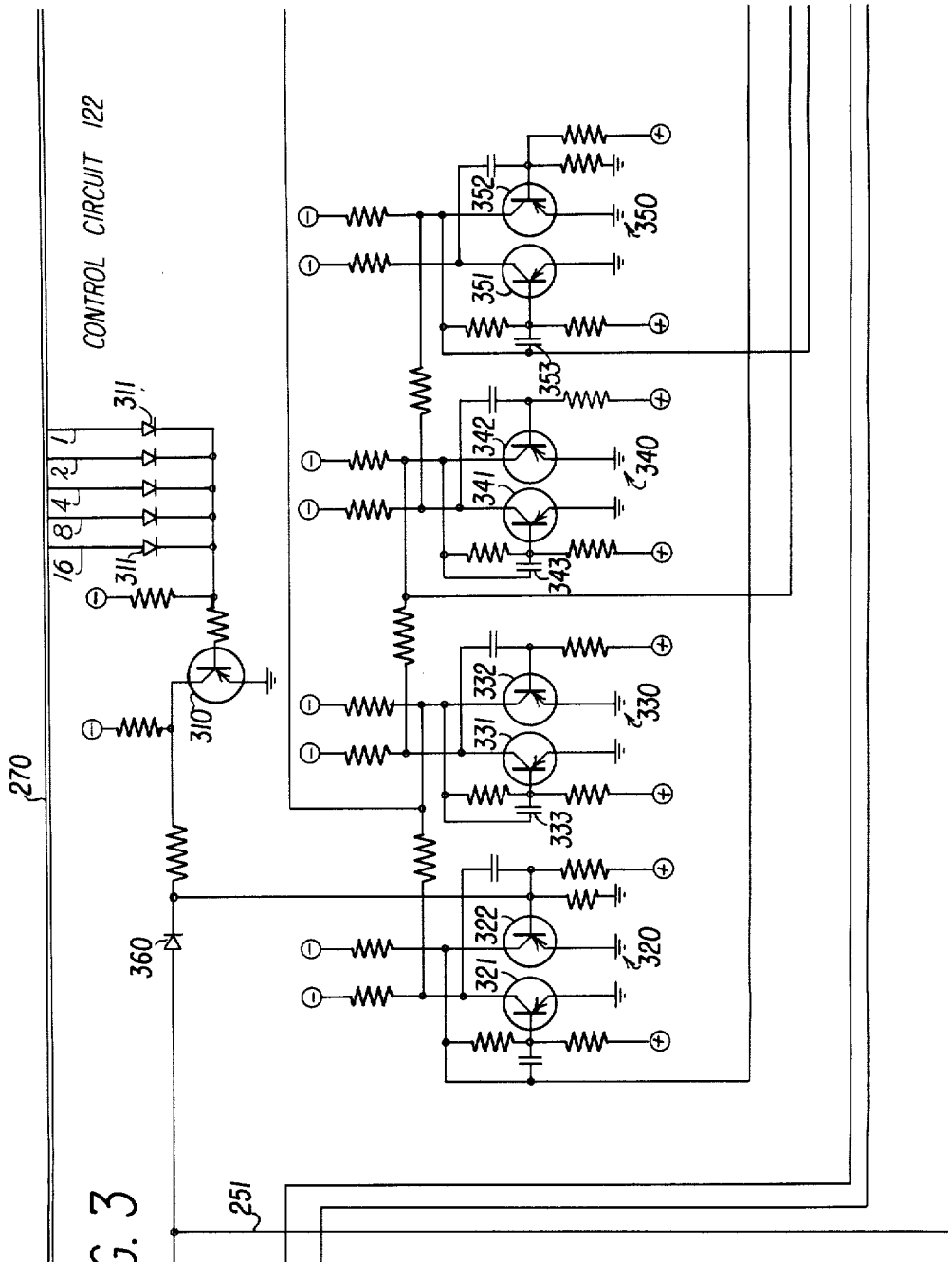
Figure 4:
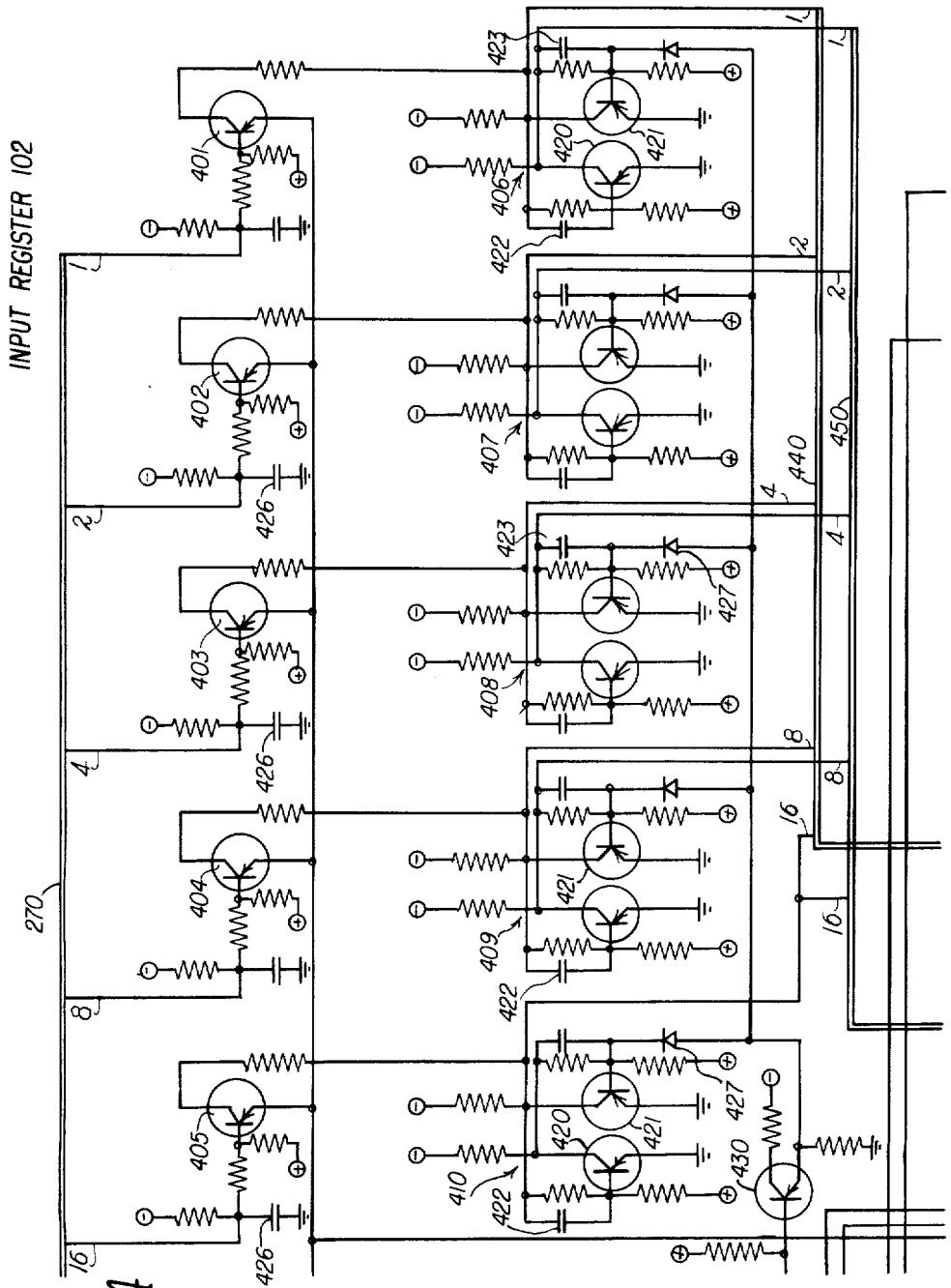
Figure 5:
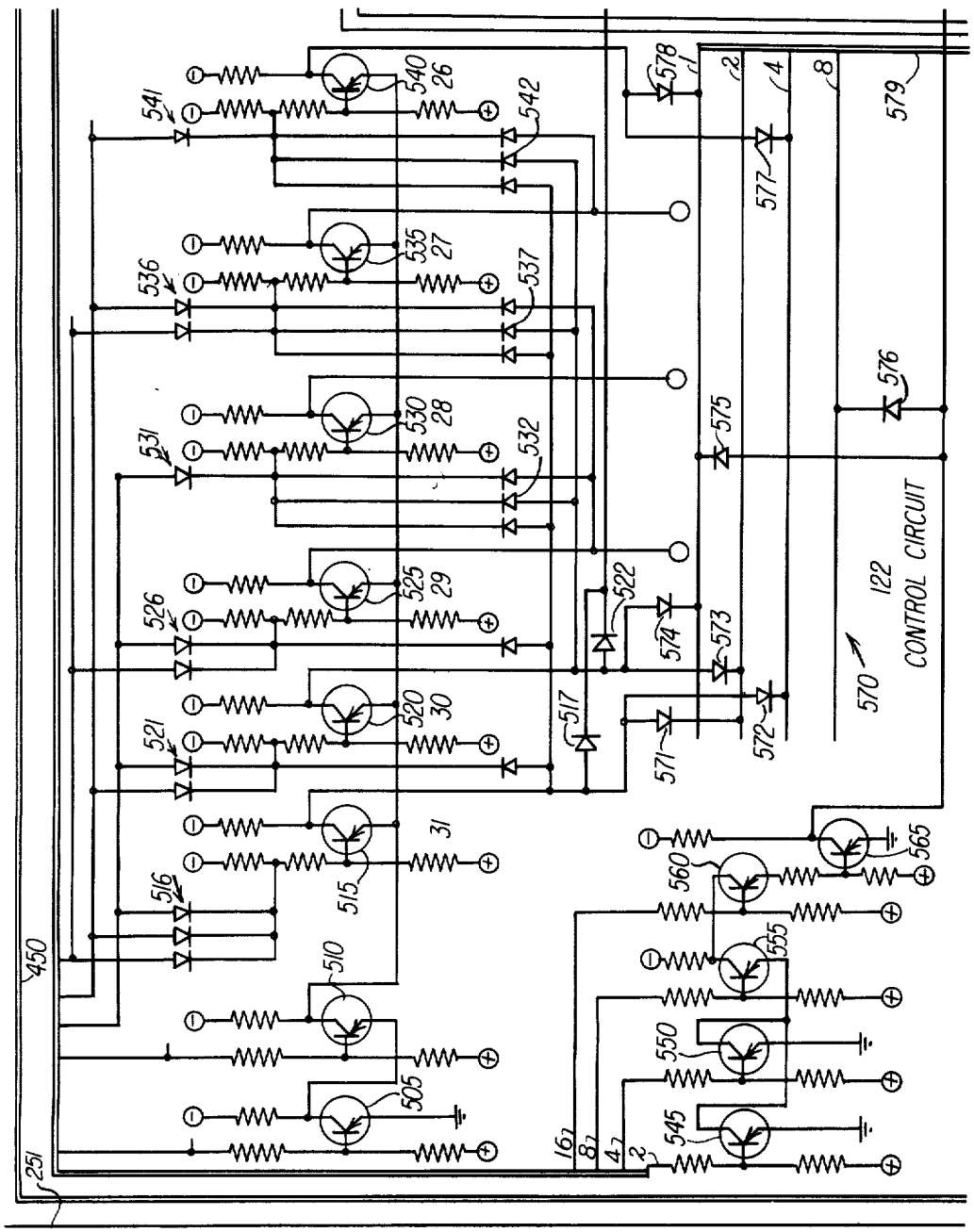
Figure 6:
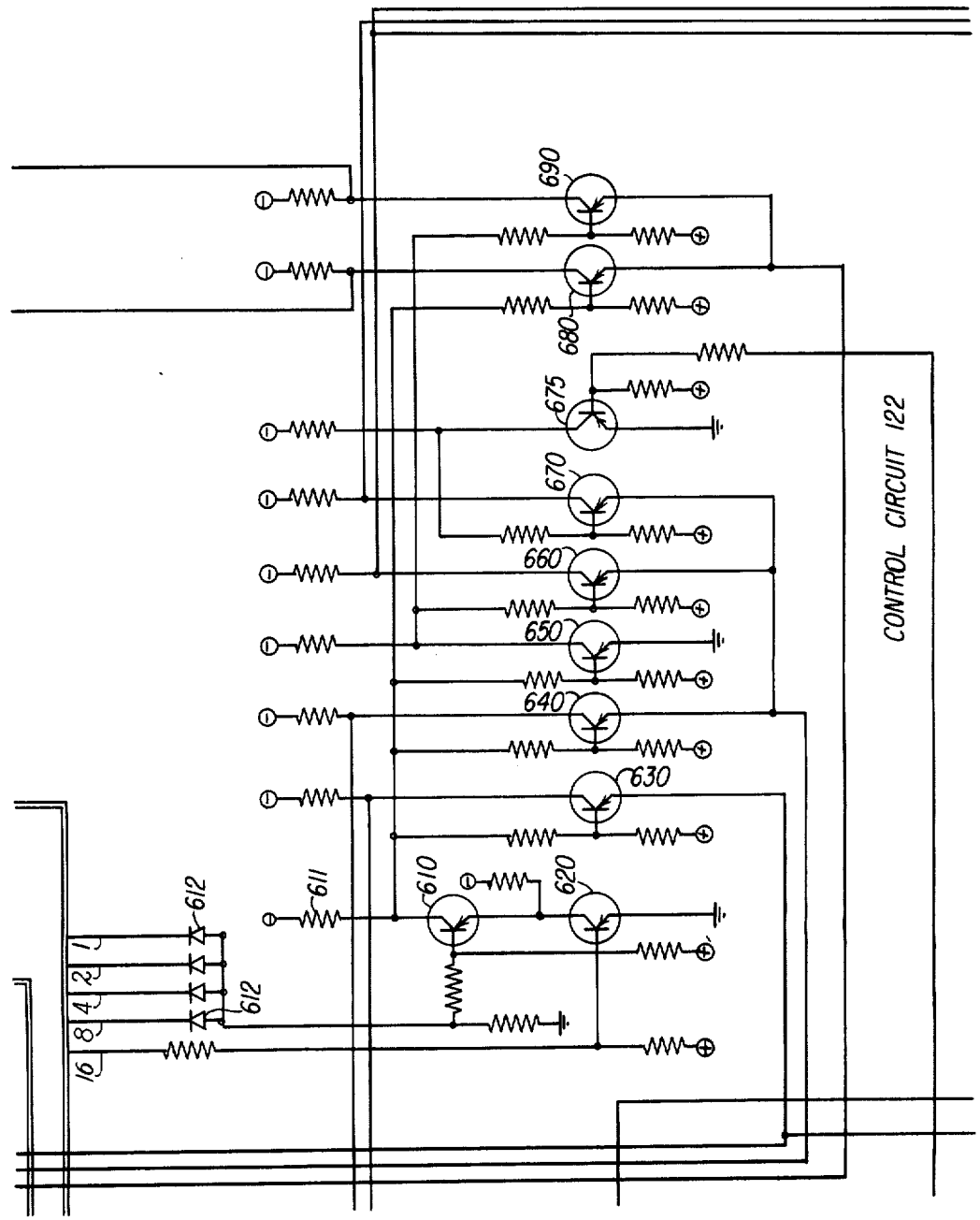
Figure 7:
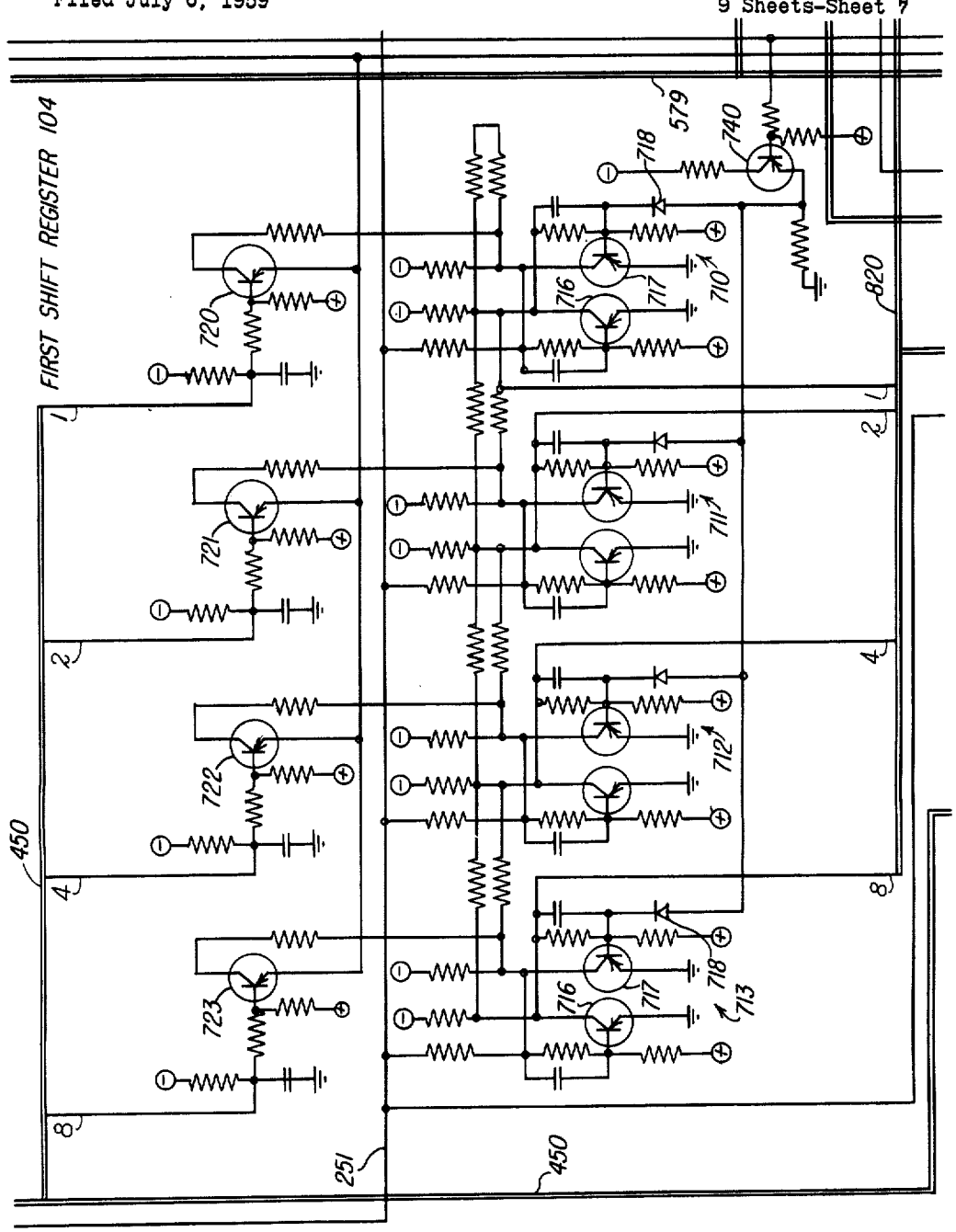

Many other objects and advantages of the present invention will be apparent from considering the following detailed description in conjunction with the drawings wherein:

FIG. 1 is a block diagram of a data handling system embodying the present invention;

FIGS. 2–9 form a schematic diagram of the circuits embodied in the system shown in FIG. 1;

FIG. 10 is a block diagram indicating the manner in which FIGS. 2–9 are placed adjacent each other to form a complete circuit diagram; and FIG. 11 is an elevational view of an assembly in a cash register which controls the setting of a slide.

Referring now more specifically to FIG. 1 of the drawings, therein is illustrated, in block diagram form, the major components of a new and improved data handling system embodying the present invention. This system includes a manually operable, key controlled input device 100 similar to that illustrated in the above identified, copending Werner application. This input device is used to enter digits into a cash register 120 and to control the cash register 120 so that selected functional operations are performed thereby. As disclosed in the copending Werner application, the input device 100 includes five manually operable keys representing the binary digits "1," "2," "4," "8" and "16" so that, by suitable manipulation of the keys, the input device 100 can provide binary coded entries having values from "1" to "31." In a typical application, the different entries provided by the input device 100 are used to represent the various digits, functions, and operations listed in the table below.

| Value of Entry From Input Device 100 | Data Represented By Entry | Nature of Data |
|---|---|---|
| 1 | 1 | Decimal Digit |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 10 | Vacant | |
| 11 | Vacant | |
| 12 | Vacant | |
| 13 | Vacant | |
| 14 | Vacant | |
| 15 | Correction | Decimal Digit |
| 16 | 0 | |
| 17 | Account 1 | Line of Goods |
| 18 | Account 2 | |
| 19 | Account 3 | |
| 20 | Account 4 | |
| 21 | Account 5 | |
| 22 | Account 6 | |
| 23 | Account 7 | |
| 24 | Account 8 | |
| 25 | Account 9 | |
| 26 | Vacant | Mode of Operation |
| 27 | Vacant | |
| 28 | Received Credit | |
| 29 | | |
| 30 | Subtotal | |
| 31 | Total | |

When the system illustrated in FIG. 1 is to be placed in operation, the input device 100 is operated to supply an entry "15" to a control circuit 122. The control circuit returns a reset signal to a plurality of shift registers 104, 106 and 108, a plurality of readout registers 110, 112 and 114, a line of goods control and register 116, and a mode of operation control and register 118. This reset pulse restores these components to a normal condition and serves to clear any spurious entries that may have been established therein when the system was placed in operation. Assuming that the first item of information to be entered into the cash register 120 is the amount of a grocery item, the operator next actuates the input device 100 to establish the entry corresponding to the value of the highest order digit in the price of the grocery article. The binary code corresponding to this entry is stored in the input register 102. This operation of the input device 100 also actuates the control circuit 122 so that a series of time spaced reset and shift signals are generated. The first reset signal is applied to the input register 102 to clear a plurality of flip-flops forming a storage means therein. The next or first shift signal renders the input register 102 effective so that the entry established by the input device 100 is stored in the flip-flops in the input register 102. The next or second reset signal clears the registers 104, 106 and 108 to condition them for receiving the entry stored in the input register 102. The last or second shift signal generated by the control circuit 122 renders the inputs of all of the registers 104, 106 and 108 effective to receive a data entry. Since only the input register 102 is storing an entry at this time, the second shift pulse from the control circuit 122 transfers the entry standing in the input register 102 to the first shift register 104 and stores "0" in the remaining shift registers.

The operator then keys the remaining digits of the price of the grocery item in a descending denominational order. In response to the keying of the second digit, this second digit is stored in the input register 102 and is transferred to the first shift register 104 concurrently with the transfer of the first digit from the first shift register to the second shift register 106. This operation, during which each keyed digit is transferred through the input register 102 to the first shift register 104 and then to a succeeding one of the shift registers 106 and 108, continues until such time as the entire amount has been transferred to and stored in the plurality of shift registers 104, 106 and 108. At this time, the operator keys an entry having a value between "17" and "25" in accordance with the nature of the item represented by the amount stored in the shift register. When an entry of this value is supplied to the input register 102, the control circuit 122 conditions the register 116 to store the line of goods entry and automatically conditions the register 118 to store an entry representing a listing operation. The circuit 122 also prevents the application of the reset and shift pulses to the shift registers 104, 106 and 108. The control circuit 122 then operates to supply a shift or read signal to the readout registers 110, 112 and 114, each of which is connected to one of the shift registers 104, 106 and 108. When the read or shift pulse is received by the registers 110, 112, and 114, the entries standing in the registers 104, 106 and 108, respectively, are transferred to and stored in the related one of the readout registers. This read pulse also stores the proper line of goods entry in the regitser 116 and the listing entry in the register 118.

The receipt of an entry in the second range of values also operates the control circuit 122 to place the cash register 120 in operation so that the entries stored in the registers 110, 112, 114, 116 and 118 are transferred to and stored in the cash register 120. The cash register 120 includes a plurality of slides that are moved to differentially spaced positions in accordance with the value of a digit to be entered or a control function to be performed. These slides are advanced toward their final settings in response to placing the cash register 120 in operation. During this movement, a plurality of signal generators responsive to the movement of the slides generates separate series of signals proportional to the number of increments of movement taken by the associated slides. Each of the signal generators is connected to one of the registers 110, 112, 114, 116 and 118. The cash register 120 also includes means for supplying a preliminary pulse to each of these registers when the cash register is placed in operation and a stop mechanism individual to each of the slides for arresting movement thereof.

When the cash register 120 is placed in operation, the preliminary pulse is returned to all of the registers 110, 112, 114, 116 and 118. These registers comprise counting chains operable to different patterns of conductive conditions in accordance with the entries standing therein. As set forth above, the registers 110, 112, 114, 116 and 118 now store the amount to be entered into the cash register 120, an indication of the line of goods to which the amount relates and the listing mode of operation that is to be performed. This information is stored in these registers in the form of a pattern of conductive conditions representing the complement of the value of the entry. Accordingly, when the cash register 120 is placed in operation, the preliminary pulse advances all of the registers 110, 112, 114, 116 and 118 a single step. When the cash register 120 initiates movement of the slides, time spaced signals are supplied from each of the pulse generating means to the associated one of the registers 110, 112, 114, 116 and 118. As each of these registers is advanced to a reset condition by the receipt of a number of pulses equal to the value stored therein, a pulse is returned from the register to the stop mechanism controlling the associated slide in the cash register 120. This pulse operates the stop mechanism to arrest further movement of the slide. Thus, the slides in the cash register 120 are adjusted to positions representing the entries stored in the registers 110, 112, 114, 116 and 118, and these registers are restored to their reset conditions. Generally, the transaction slides, such as the line of goods and mode of operation slides, are set under the control of their associated registers before movement of the amount slides is initiated. Thus, the information represented by the adjusted digit or amount slides is utilized by the cash register 120 in the manner directed by the set line of goods and mode of operation slides.

At this time, the line of goods register 116, the mode of operation register 118, and the readout registers 110, 112 and 114 are cleared and the amount previously entered by the input device 100 remains stored in the shift registers 104, 106 and 108. In the event that the next amount to be entered has a value identical to the previously entered amount, the data handling system can be operated to repeat the transfer of the amount from the registers 104, 106 and 108 into the cash register 120 merely by keying the line of goods designation into the system and without repeating the keying of the amount. As an example, if the cost of a second identical grocery item is to be entered, the input device 100 is operated to supply another entry to the input register 102 having the proper value in the range between "17" and "25." This value is again stored in the line of goods control and register 116, the register 118 stores a listing operation and the control circuit 122 again transfers the stored amount from the shift registers 104, 106 and 108 to the readout registers 110, 112 and 114. This amount is then entered into the cash register 120 in conjunction with the stored line of goods entry and mode of operation entry in the manner described above. At the completion of this operation, the system is again cleared or reset except for the amount which remains stored in the shift registers 104, 106 and 108.

When the amount of the next item is to be entered, the first digit thereof is supplied to the input register 102 from the input device 100. When this information is supplied to the control circuit 122, circuits therein determine that the value of this entry falls within the first range and is less than the value of the preceding entry which was within the second range. Accordingly, the control circuit 122 automatically supplies a reset signal to all of the registers 104, 106, 108, 110, 112, 114, 116 and 118 to clear the system for receiving the next amount entry.

When a total or subtotal, for instance, is to be established by the cash register or when the register is to be operated in a particular manner, the input device 100 is operated to supply a signal to the input register 102 having a value in the third range of "26"–"31." When a code in this range is supplied to the input register 102, the control circuit 122 sets the registers 110, 112, 114, 116 and 118 to "0," transfers the mode of operation code from the input register 102 to the mode of operation control and register 118, and prevents a transfer to either the first shift register 104 or the line of goods register 116. The control circuit 122 also supplies a start signal to the cash register 120 so that the function or mode of operation controlling slide in the cash register 120 is operated to a setting determined by the value stored in the register 118. When the slide associated with the register 118 is set in its predetermined position, the cash register 120 is operated to perform the designated function. Since the value of the entry used to control the mode of operation of the cash register 120 is above the range used to enter digits, the subsequent entry of a digit by the input means 100 controls the circuit 122 so that a reset pulse is applied to all of the registers in the system.

If the mode of operation slide is set to a position representing a total or subtotal operation, the control circuit 122 is operated to render the preliminary pulse generating means ineffective to supply a pulse to the readout registers 110, 112, 114 and 116 so that these registers remain in settings representing the true value of "0." The preliminary pulse is supplied to the register 118 since this register stores the binary complement of the value of the control entry. The cash register 120 then moves the amount slides under the control of the listing accumulator in the cash register so that signals are supplied to the registers 110, 112 and 114 to operate these registers to settings representing the true value of the amount standing in the listing accumulator. The registers 110, 112 and 114 can then be controlled by the circuit 122 to operate a parallel output recorder or device 126 to record the total or subtotal. This recorder can also record the value of the control entry under the control of the circuit 122.

The data handling system also includes a record reader 124 which is used to provide a parallel input to all of the readout registers 110, 112 and 114 and to the control registers 116 and 118. Thus, in the event that the information to be entered into the cash register is recorded on a card or tape, these entries can be stored in the registers 110, 112, 114, 116 and 118 without passing through either the input register 102 or the shift registers 104, 106 and 108. The record reader 124 is connected to the control circuit 122 so that the necessary control pulses can be supplied by this circuit. When the values have been stored in the readout registers 110, 112 and 114, the line of goods register 116, or the mode of operation register 118, the transfer of this information to the cash register 120 takes place in the manner described above.

In addition, in the event that it is desirable to directly derive an output from the registers 110, 112, 114, 116 and 118 without requiring the operation of the cash register 120 or the storage of the information therein, the parallel output device 126 can also be used. This device is connected to the control circuit 122 so that, when the device 126 is placed in operation, the necessary signals for transferring the information from the output of the registers 110, 112, 114, 116 and 118 can be supplied by the circuit 122.

CASH REGISTER 120

The cash register 120 (FIG. 9) can comprise one of the many types well known in the art.

In general, the cash register includes data accumulation, storing, translating and recording means which are selectively controlled by a plurality of mechanically movable slides. These slides or racks are set to differential positions in accordance with the information to be entered into or the control functions to be performed by the cash register 120. As indicated above, the slides are moved from a normal setting toward a setting representing the value or function to be entered in response to the initiation of a cycle of operation of the cash register 120. During movement of the slides, the cash register supplies a series of pulses proportional to the movement of the slides to the associated registers 110, 112, 114, 116 and 118. When these registers have received signals corresponding to the entries stored therein, the registers return a signal to stop means associated with the related slides to arrest further movement thereof in the positions corresponding to the entries stored in the associated registers. In a like manner, when the total or subtotal standing in the listing accumulator is to be read out to the registers, the slides are moved under the control of the listing accumulator to supply signals to the registers 110, 112 and 114 representing the true value of the total or subtotal. During this operation, the preliminary pulse generating means is rendered inoperative to supply a pulse to these registers.

As indicated above, the cash register 120 includes means for returning a number of pulses to each register that is equal to the number of steps of movement through which each of the slide elements is advanced so that, when these pulses have operated the related register to its normal setting, the register returns a stop pulse for arresting further movement of the slide. The entries are stored in the registers in complementary binary form so that, when a number of pulses one greater than the value of the entry stored in the register has been applied thereto, the register is operated to a reset condition. As an example, when the binary complement of the decimal digit "5" is stored in one of the registers, this register is restored to its normal condition by the application of six pulses thereof. Accordingly, the cash register 120 includes common means for supplying a preliminary pulse to the inputs of all of the registers 110, 112, 114, 116 and 118 and individual means associated with each of the slides for supplying a number of pulses to the associated register that is equal to the number of steps through which the related slide is advanced.

To provide this preliminary pulse, the cash register 120 includes a pair of contacts 901 (FIG. 9) that are normally maintained in an open condition by a cam 902. This cam is rotated through a single cycle of revolution during each cycle of operation of the cash register 120 by a main or control shaft. The cam 902 is provided with a control surface which momentarily closes the contacts 901 near the beginning of each cycle of revolution. The closure of the contacts 902 forwards a ground pulse through a diode 903 directly to the counting input of the register 118. However, since a preliminary pulse is not used in some registers when data is to be read out of the cash register 120, the preliminary pulse is forwarded to the registers 110, 112, 114 and 116 through a gate transistor 906. The emitter of this transistor, the base electrode of which is normally connected to a negative potential, is connected to the contacts 901. Thus, when the contacts 901 are closed, the transistor 906 is rendered conductive to apply a ground pulse through a plurality of diodes 907 to the counting inputs of the registers 110, 112, 114 and 116. Thus, if one of the registers is set in a condition representing the binary complement of "0," the application of this single pulse resets this register to a normal condition and returns a stop pulse for preventing movement of the slide from its reset or "0" representing condition.

To provide means for controlling movement of the slides, each of the slides is provided with an associated control mechanism 1100 (FIG. 11) which includes both a pulse generating assembly 1104 for supplying a number of pulses equal to the number of steps that a control or "ruler" element 1102 moves away from the reset or "0" representing position and a stop assembly 1120 for arresting further movement of the control or "ruler" element 1102 when this element is advanced to a setting representing the entry standing in the associated register. The control or "ruler" element 1102 is movable to the right in FIG. 11 during setting movement and is moved to the left in FIG. 11 when it is reset or restored to a normal position.

The pulse or signal generating assembly 1104, which generates a pulse for each increment or step of movement of the element 1102, includes a coil or winding 1106 which is mounted on a U-shaped magnetic frame element 1108 and which is provided with a magnetic core element 1110. The core 1110 is magnetically coupled with the frame 1108 by an armature 1112 that is pivotally mounted on one arm of the frame 1108. The armature 1112 is normally biased into engagement with the core 1110 by suitable resilient means 1114 connected between a free end of the armature 1112 and a portion of the supporting frame in the cash register 120. The armature 1112 is formed with a depending cam follower portion 1116 having an inclined lower end which is adapted to sequentially engage eight generally saw-toothed projecting portions 1118 formed integral with the element 1102.

Accordingly, when the "ruler" element 1102 is moved to the right in FIG. 11 during setting movement of the slide, the cam follower 1116 drops from a shoulder 1117 and then rides over the teeth 1118 so that the armature 1112 is periodically moved into and out of engagement with the end of the core 1110. The varying reluctance of the magnetic structure varies the flux field coupling the winding 1106 to induce a pulse for each operation of the armature 1112. These pulses are supplied to the related one of the registers 110, 112, 114, 116 and 118 through a suitable coupling network 904 (FIG. 9), such as a differentiating circuit or amplifying and wave shaping means. Obviously, the selective movement of the armature 1112 can be used to actuate contact springs or any other pulse generating means which supply the signals proportional to the movement of or the setting of the "ruler" 1102. Thus, the pulse generator 1104 is directly controlled by the movement of the "ruler" element 1102 to transmit a single pulse for each of the nine steps of movement of the related slide.

Figure 9:
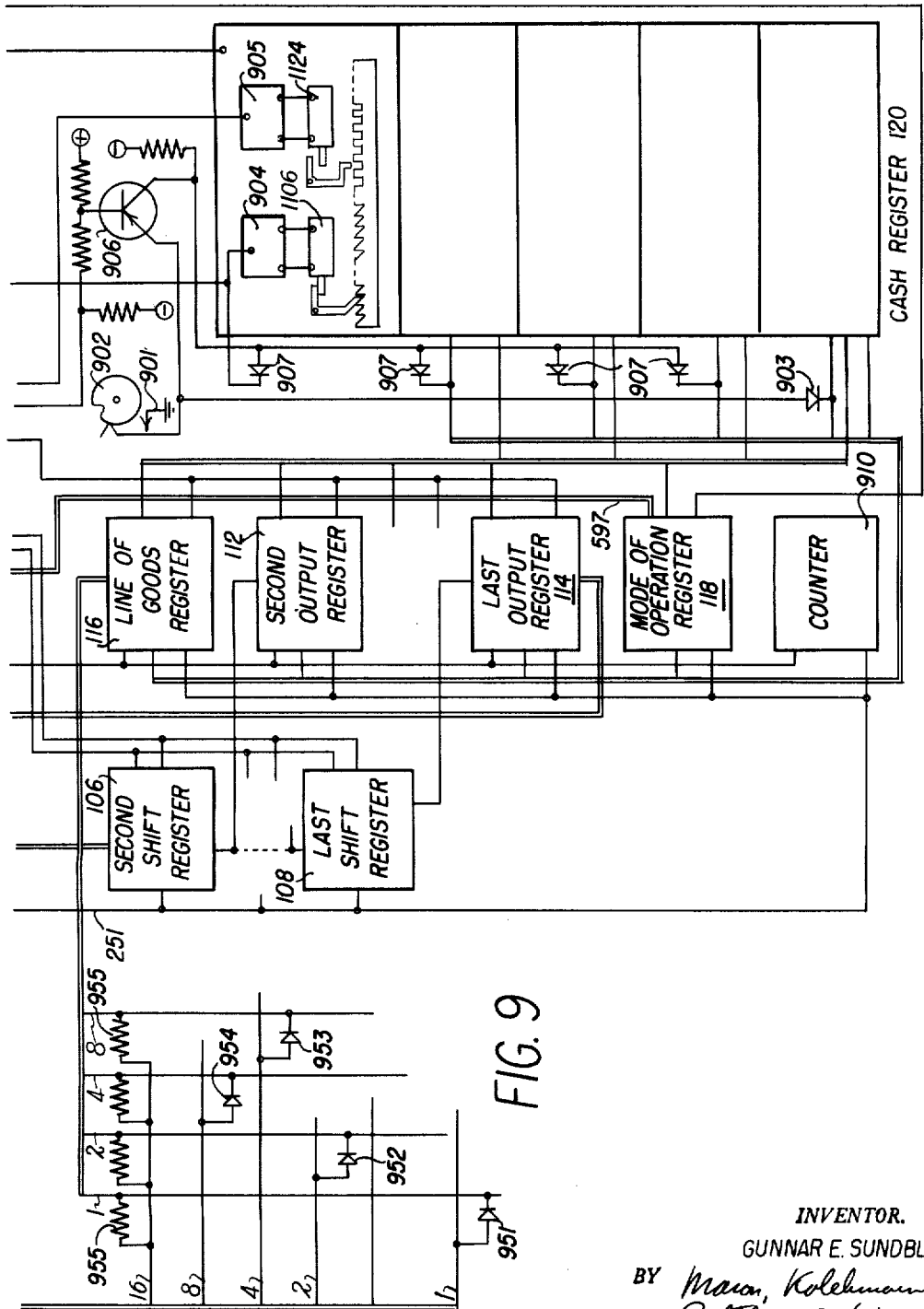

The mechanism 1100 also includes the stop assembly 1120 which cooperates with nine notches 1122 in the element 1102 to arrest movement of the slide when it has been adjusted to a setting corresponding to the entry stored in the related register. The stop assembly 1120 includes a winding 1124 which is connected to the output of the related register through a suitable coupling circuit 905 (FIG. 9). This circuit can comprise a monostable flip-flop which is responsive to positive-going pulses and which drives an emitter follower connected to the winding 1124. The winding 1124 is provided with an axially extending core 1126 and is mounted on a generally U-shaped metallic frame 1128. One end of the frame 1128 carries a pivotally mounted armature 1130 which is biased away from the end of the core 1126 by suitable resilient means (not shown). The armature 1130 is connected to a stop lever 1132 having a lower end that is adapted to be moved into one of the notches 1122.

When the "ruler" element 1102 and the connected slide have been moved to a setting corresponding to the entry in the related register, the register returns an operating signal to the winding 1124 through the coupling circuit 905. The energization of the winding 1124 pivots the armature 1130 in a clockwise direction so that the lower end of the stop lever 1132 moves into one of the notches 1122. This arrests further movement of the control element 1102 and retains the associated slide in a position corresponding to the entry stored in the related register. When the "ruler" element 1102 is restored to its normal position, suitable means lift the lever 1132 and the cam follower 1116 out of engagement with the element 1102.

The "ruler" 1102 includes a first notch 1122a that receives the end of the lever 1132 when the assembly 1120 is operated by the preliminary pulse representing "0" before any movement of the "ruler" 1102. A second notch 1122b is positioned to receive the end of the lever 1132 when the first pulse is generated by moving the "ruler" a single step so that the follower 1116 drops off the shoulder 1117. It should be noted that only nine notches 1122 are provided. Thus, when the last pulse representing "9" is generated by the follower 1116 dropping from the last tooth 1118, the "ruler" 1102 has been moved to its fully displaced position, and this movement is arrested by stop means in the cash register 120 rather than by the assembly 1120. If the cash register 120 is operated on other than a decimal basis, the "ruler" element 1102 can include a greater or lesser number of teeth 1118 and notches 1122 to permit the "ruler" to be set in different numbers of digit representing positions. In addition, the transaction "rulers" 1102 can include any number of teeth 1118 and notches 1122 in accordance with the number of functions to be performed.

In order to advise the cash register 120 of the nature of the operation to be performed on the entered amount, this cash register includes means for initiating movement of the transaction "rulers" 1102, such as those representing line of goods and mode of operation, prior to the time at which the movement of the amount "rulers" 1102 is initiated. As an example, the transaction "rulers" 1102 are placed in movement after 25° of rotation of the main shaft in the register 120 and are set by the time that 105° of rotation have been completed. The amount "rulers" 1102 are placed in movement after 125° of rotation of the main shaft, and these "rulers" are fully set by the time that 200° of rotation have been completed.

Further, when a total or subtotal is to be read from the cash register 120 to the register 110, 112 and 114, the cash register includes means, such as the wheels or gears of the input or listing accumulator, for controlling the movement of the "rulers" 1102 associated with the registers 110, 112 and 114. The control circuit 122 blocks the preliminary pulse input to these registers so that they remain set to the true value of "0." The cash register sets the transaction "rulers" 1102 and then moves the amount "rulers" through distances representing the various digits of the total or subtotal. During this movement, the assemblies 1104 supply pulses through the circuits 904 to the counting inputs of the register 110, 112 and 114.

ENTERING AN AMOUNT INTO THE SHIFT REGISTERS 104, 106 AND 108

When an amount or the cost of an item is to be entered into the shift registers 104, 106 and 108, the input device 100 is manually operated to transmit binary coded signals representing the successive digits of the amount to the input register 102, and these digits are successively transferred from the input register 102 to the shift registers 104, 106 and 108.

The input register 102 (FIG. 4) comprises identical flip-flops 406–410 which represent the binary digits "1," "2," "4," "8" and "16," respectively, and which are selectively actuated to set or reset conditions under the control of five input transistors 401–405. The transistors 401–405 are selectively controlled by the input device 100 (FIG. 2). Each of the flip-flops 401–410 includes a pair of transistors 420 and 421 whose collector and base electrodes are cross-coupled by a pair of capacitors 422 and 423. Each of the flip-flops 406–410 is selectively operable between a reset or normal stable condition in which the left-hand transistor 420 is in a conductive state and a set or operated stable condition in which the right hand transistor 421 is in a conductive state. To provide a first means for deriving an output from the flip-flops 406–410, the collector electrodes of the transistors 421 are connected to the conductors of a cable 440 so that, when the flip-flops 406–410 are operated to their set conditions, the conductors are connected to ground potential. To provide a second output, the collector electrodes of the transistors 420 in the flip-flops 406–409 representing the binary digits "1," "2," "4," and "8" are connected to the conductors of a cable 450. In addition, the collector electrode of the transistor 421 in the flip-flop 410 representing the binary digit "16" is connected to another conductor in the cable 450. Thus, when one or more of the flip-flops 406–409 is operated to a set condition, one or more of the conductors in the cable 450 representing "1," "2," "4," and "8" is selectively supplied with a negative potential by the operated one of the flip-flops. The conductor connected to the flip-flop 410 drops to a negative potential for all entries having a value of "16" or greater.

To provide a means for selectively operating the flip-flops 406–410 under the control of the actuation of the input device 100, the five transistors 401–405 are provided. A collector electrode of each of these transistors is connected to the base electrode of one of the transistors 420 in the flip-flops 406–410. The emitter eelctrodes of these transistors are normally connected to a negative potential at the collector electrode of a transistor 332 in the control circuit 122. The base electrode of each of the transistors 401–405 is connected to a storage capacitor 426 and a voltage dividing network that normally maintains the base electrode at a somewhat negative potential. However, the input transistors are not normally conducting in view of the higher negative bias supplied to the emitters thereof from the collector circuit of the transistor 332. The base electrodes of the transistors 401–405 are connected over a cable 270 to a plurality of manually actuated keys 201, 202, 204, 208 and 216 in the input device 100, which represent the binary digits "1," "2," "4," "8" and "16," respectively.

When an amount is to be transmitted to the shift registers 104, 106 and 108, the input device 100 is manually operated to successively enter the digits of the amount into the input register 102. Assuming that an entry is to be made representing an article cost or amount of "$6.36," the units dollars digit is first entered into the input register 102 by actuating the keys 202 and 204 to a closed condition to represent the units dollars digit "6." The closure of these two keys forwards a positive potential to the capacitors 426 in the base electrode circuits of the transistors 402 and 403 so that these two capacitors 426 charge to a more positive potential. The capacitors 426 associated with the transistors 401, 404 and 405 remain charged to a somewhat negative potential. Thus, the input transistors 401–405 are now conditioned to supply the binary code received from the input device 100 to the storage flip-flops 406–410.

The operation of the input device 100 also supplies a signal to the control circuit 122 so that a series of shift and reset pulses are supplied to the input register 102 and the shift registers 104, 106 and 108 to cause the storage of the entry in the register 102 and the transfer of the entry from the register 102 to the first shift register 104. More specifically, when one of the keys 201, 202, 204, 208 or 216 is operated, the positive potential provided at the closed pair of contacts is supplied over the cable 270 to forward bias one of a plurality of diodes 311 individual to each of these leads so that the potential at the base electrode of a normally conductive transistor 310 becomes more positive. This renders the transistor 310 nonconductive so that the potential at its collector electrode becomes more negative. This potential operates a monostable flip-flop 320, which provides a first reset pulse generator, to its unstable condition in which a transistor 322 is in a conductive state and a transistor 321 is nonconductive. This provides a positive-going first reset pulse.

When the transistor 322 is rendered conductive, the base electrode of a normally conductive transistor 430 becomes more positive, and the transistor 430 is rendered nonconductive. When the transistor 430 becomes nonconductive, a plurality of diodes 427 connected to the base electrodes of the transistors 421 in the flip-flops 406–410 are biased in a forward direction to hold the base electrodes of these transistors substantially at ground potential. This renders these transistors nonconductive and renders the transistors 420 conductive. This operates all of the flip-flops 406–410 to their reset or normal condition so that the input register 102 is cleared of data and restored to a normal condition in which it is capable of receiving and storing the entry stored in the input transistors 401–405. The above described operation of the monostable flip-flop 320 to its set condition in which the transistor 321 is nonconductive permits a coupling capacitor 333 in a second monostable flip-flop 330, which provide a first shift pulse generator, to charge more fully.

When the operated keys 202 and 204 are released, the positive potential is removed from the base electrodes of the input transistors 402 and 403. However, these transistors remain positively biased due to the charge accumulated on the capacitors 426 connected to their base electrodes. Further, when the keys 202 and 204 are released, the forward biasing potential for the diodes 311 is removed so that the transistor 310 is again rendered conductive. This drives the base electrode of the transistor 322 in a positive direction so that the flip-flop 320 is restored to its normal or reset condition in which the transistor 321 is in a conductive condition. When the transistor 322 is rendered nonconductive, the potential applied to the base electrode of the reset transistor 430 drops in a negative direction so that this transistor again becomes conductive to remove the biasing potential from the diodes 427. Thus, the clamping potential applied to the base electrodes of the transistors 421 in the flip-flops 406–410 is removed to permit the flip-flops to be operated under the control of the input transistors 401–405.

When the transistor 321 in the flip-flop 320 is rendered conductive, the charge on the capacitor 333 drives the base electrode of a transistor 331 more positive so that this transistor is rendered nonconductive and the transistor 332 is rendered conductive. When the transistor 332 is rendered conductive, the emitter electrodes of the input transistors 401–405 are elevated to substantially ground potential. This enables these transitsors to be rendered conductive. As described above, the base electrodes of the transistors 402 and 403 are held at a potential that is positive relative to their emitter electrodes so that these transistors are not rendered conductive. However, the base electrodes of the transistors 401, 404 and 405 representing the binary digits "1," "8" and "16" are held at a negative potential relative to their emitter electrodes, and these transistors are rendered conductive.

When the transistors 401, 404 and 405 are rendered conductive, the base electrodes of the transistors 420 in the flip-flops 406, 409 and 410 are driven more positive to render these transistors nonconductive and to render the transistors 421 in these flip-flops conductive. Thus, the flip-flops 406, 409 and 410 representing the binary digits "1," "8" and "16" are operated to their set condition while the flip-flops 407 and 408 representing the binary digits "2" and "4" remain in the reset condition. Accordingly, the flip-flops 406–410 have now been operated to a conductive pattern of set conditions representing the complement of the entered units dollars digit "6." At this time, the conductors extending to the cable 440 that are connected to the flip-flops 406, 409 and 410 are at ground potential representing the complement of the entered digit "6," and the conductors in the cable 440 connected to the flip-flops 407 and 408 remain at a negative potential representing the entered digit "6." Conversely, the conductors in the cable 450 connected to the flip-flops 406, 409 and 410 representing the complement of the entered digit "6" are at a negative potential, and the conductors connected to the flip-flops 407 and 408 representing the entered digit "6" are at ground potential. Accordingly, the units dollars digit "6" has now been stored in the input register 102.

When the flip-flop 330 is operated to its set condition, the transistor 331 is rendered nonconductive so that a coupling capacitor 343 in a monostable flip-flop 340, which includes a pair of transistors 341 and 342, becomes more fully charged. The flip-flop 340 provides a second reset pulse generator that is used to reset the shift registers 104, 106 and 108 to their normal condition to condition them for receiving the digits supplied by the input register 102. Thus, the operation of the first shift pulse generator, i.e., the flip-flop 330, transfers the entry from the transistors 401–405 to the flip-flops 406–410 and also conditions the second reset pulse generators, i.e., the flip-flop 340, for operation.

Each of the shift registers 104, 106 and 108 (FIGS. 7 and 9) includes four storage flip-flops 710–713 which represent the binary digits "1," "2," "4" and "8," respectively, and which are substantially identical to the flip-flops 406–410 described above. Thus, each of the flip-flops 710–713 includes a transistor 716 that is in a conductive condition in the reset or normal condition of the flip-flop and a transistor 717 that is in a conductive condition in the set or operated condition of the flip-flop. In their normal condition in the circuit, the registers 104, 106 and 108 are operated so that all of the flip-flops 710–713 are in their set condition in which the transistors 717 are conducting. The setting of the flip-flops 710–713 to a pattern of conductive conditions representing the value of an entered digit is controlled by four input transistors 720–723. These transistors are connected to the storage flip-flops and operate to control these flip-flops in substantially the same manner as the input transistors 401–405 in the input register 102.

The base electrodes of the transistors 720–723 are connected to the related output conductors of the flip-flops 406–409 in the input register 102 through the cable 450. Thus, when the flip-flops 406–409 are operated to a pattern of conductive conditions representing an entered digit, the output potentials from these flip-flops are forwarded over the cable 450 to the input of the first shift register 104. In the illustrative example, the complement of the units dollars digit "6" is stored in the input register 102 so that ground is applied to the storage capacitors in the base electrode circuits of the transistors 721 and 722 and the storage capacitors in the base electrode circuits of the transistors 720 and 723 remain charged to a negative potential to condition these transistors for subsequent conduction.

Referring back to the above described operation of the flip-flop 330 to its set condition, this flip-flop is monostable and returns to its stable reset condition in which the transistor 332 is nonconductive and the transistor 331 is conductive after a predetermined time delay. At this time, the first positive-going shift pulse is terminated so that the enabling potential for the emitter electrodes of the transistors 401–405 is removed to render these transistors nonconductive. When the transistor 331 is placed in conduction, the coupling capacitor 343 in the monostable flip-flop 340 drives the base electrode of a transistor 341 more positive so that the transistor 341 is rendered nonconductive and a transistor 342 is rendered conductive. When the transistor 342 is rendered conductive, the ground potential or positive-going second reset pulse at its collector electrode is forwarded to the emitter electrode of a transistor 630 in the control circuit 122. The transistor 630 forms a control gate for supplying reset pulses to the shift registers 104, 106 and 108 only when the value of the entry supplied to the input register 102 has a value of "16" or less. In other words, the transistor 630 provides a gate for supplying reset pulses to the shift registers only when the value of the entry supplied to the input register 102 is such as to indicate that the entry is to be applied to the shift registers. The base electrode of the transistor 630 is normally supplied with a negative potential through a resistor 611. Thus, the transistor 630 is rendered conductive when the emitter thereof is returned to ground through the conductive transistor 342 in the flip-flop 340.

When the transistor 630 is rendered conductive, the base electrode of a transistor 740 in the first shift register 104 and a similar transistor in each of the shift registers 106 and 108 is elevated toward ground potential. The transistor 740 is normally conductive so that the ground potential forwarded to its base electrode renders this transistor nonconductive. This forward biases a plurality of resetting diodes 718 so that the transistors 717 in all of the flip-flops 710–713 are operated to a nonconductive condition. This operates all of the flip-flops 710–713 to their reset or normal condition in which the transistors 716 are conductive. Thus, the pulse supplied by the second reset pulse generator including the flip-flop 340 resets the storage flip-flops in the register 104, 106 and 108 to a normal condition.

Referring back to the above described operation of the flip-flop 340 to its set condtion, when the transistor 341 is rendered nonconductive a more negative voltage is applied to a coupling capacitor 353 in the base electrode circuit of a transistor 342 in a flip-flop 350 forming a second shift pulse generator. This permits this capacitor to charge more fully. When the flip-flop 340 resets at the end of its delay interval, the transistor 342 becomes nonconductive to render the transistor 630 nonconductive and to render the plurality of resetting transistors 740 conductive. This removes the resetting potentials at the inputs of the transistors 717 to permit the flip-flops 710–713 in the registers 104, 106 and 108 to be controlled by the input transistors 720–723. When the transistor 341 in the flip-flop 340 again becomes conductive, the base electrode of the transistor 351 is driven more positive so that the second shift pulse generator provided by the flip-flop 350 is operated to its set condition in which the transistor 351 is nonconductive and a transistor 352 is conductive.

When the transistor 352 is rendered conductive, ground is forwarded to the emitter electrodes of a plurality of gate transistors 640, 660 and 670 in the control circuit 122. The transistor 640 provides a gate for forwarding the second shift pulse to the shift registers 104, 106 and 108 when the entry in the input register 102 has a value in the range used to enter amounts into the shift registers. The transistor 640 is provided with a negative potential at its base electrode through the resistor 611. Consequently, the application of ground to its emitter electrode renders the transistor 640 conductive so that the ground potential at its collector electrode is forwarded to the emitter electrodes of all of the input transistors in the shift registers 104, 106 and 108.

When the transistor 640 is rendered conductive to connect the emitter electrodes of the transistors 720–723 to ground, the transistors 720–723 are conditioned for conduction. The enabled transistors 720 and 723 are rendered conductive to operate the flip-flop 710 and 713 to their set condition while the flip-flops 711 and 712 remain in their reset condition. The conductive pattern provided by the selective operation of the flip-flops 710 and 713 stores the complement of the entered units dollars digit "6" in the first shift register 104.

The base electrodes in the input transistors in the remaining shift registers, such as the registers 106 and 108, are held at a negative potential because of the previous set conditions of all of the flip-flops in the preceding registers. Thus, when the second shift pulse is applied to these registers, the storage flip-flops in the shift registers 106 and 108 are operated to a set condition. Accordingly, at this time, the complement of the entered units dollars digit "6" is stored in the first shift register 104 and the remaining shift registers are in a "0" manifesting condition. At the end of the delay interval of the monostable flip-flop 350, this circuit restores to its normal condition in which the transistor 351 is conductive and the transistor 352 is nonconductive. When the transistor 352 returns to a nonconductive state, the gate transistor 640 is rendered nonconductive to remove the ground potential supplied to the emitter electrodes of the input transistors in the shift registers 104, 106 and 108. This terminates the selective storage of the first digit entered into the data handling system by the input device 100.

The operator now enters the next lowest order digit of the amount by selectively operating the input device 100. In the illustrative example set forth above, the value of the ten cents digit is "3." Accordingly, the keys 201 and 202 are closed to forward a positive potential to the storage capacitors 426 associated with the base electrodes of the input transistors 401 and 402 in the input register 102. These positive potentials are also forwarded through the diodes 311 to render the transistor 310 nonconductive to initiate the sequential operation of the flip-flops 320, 330, 340 and 350. When the flip-flop 320 is operated, the flip-flops 406–410 are reset to a normal condition to clear the previously entered units dollars digit "6," and, when the flip-flop 330 is operated, the complement of the ten cents digit "3" is entered into the flip-flops 406–410 under the control of the input transistors 401–405 in the manner described above. The complement of the tens cents digit "3" is stored in the input register 102 by providing a pattern of conductive conditions in which the flip-flops 408–410 are set and the flip-flops 406 and 407 remain in their reset condition.

When the second reset pulse generator 340 is operated, the storage flip-flops in the shift registers 104, 106 and 108, such as the flip-flops 710–713, are operated to their reset condition in which all of the transistors 716 are rendered conductive. This clears the shift registers to receive a subsequent entry. It should be noted that when the flip-flops 710–713 in the first shift register 104, for instance, are restored to their normal condition, the base electrodes of the input transistors in the second shift register 106 remain selectively biased in accordance with the previous entry in the register 104 because of the storage capacitors. More specifically, when the flip-flops 710 and 713 are operated to their set conditions so that the transistors 716 in these two flip-flops are rendered nonconductive, the storage capacitors associated with the input transistors in the second shift register 106 which correspond to the transistors 720 and 723 are provided with an enabling potential. Conversely, the conductive condition of the transistors 716 in the flip-flops 711 and 712 prevents the establishment of an enabling potential on the storage capacitors connected to the base electrodes of the transistors in the second shift register 106 corresponding to the transistors 721 and 722.

Accordingly, when the second shift pulse generator including the flip-flop 350 is operated to its set condition, the flip-flops in the second shift register 106 are operated to a conductive pattern representing the complement of the units dollars digit "6." Similarly, the input transistors 722 and 723 in the first shift register 104 set the flip-flops 712 and 713 while the flip-flops 710 and 711 are held in their reset condition. This provides the first shift register 104 with a conductive pattern representing the complement of the ten cents digit "3." When the flip-flop 350 restores to its reset condition, the first shift register 104 provides a conductive pattern representing the binary complement of the second entered or ten cents digit "3" and the second shift register 106 provides a conductive pattern representing the binary complement of the first entered or units dollars digit "6."

In a similar manner, the third or units cents digit "6" is stored in the shift registers by manually operating the keys 202 and 204 in the input device 100. This causes the transfer of the complement of the units cents digit "6" from the input register 102 to the first shift register 104, the transfer of the tens cents digit "3" to the second shift register 106, and the transfer of the units dollars digit "6" to the next succeeding shift register, such as the last shift register 108. At the completion of this storing operation, the shift registers 104, 106 and 108 provide conductive patterns representing the binary complement of the amount "6.36" that is to be transferred to the cash register 120. Obviously, amounts including significant digits in a greater number of denominational orders can be stored in the data handling system by providing a suitable number of series connected shift registers, like the registers 104, 106 and 108. It should be noted that, if an amount having a number of significant digits that is less than the number of the shift registers is to be entered, the unused shift registers remain in a condition manifesting the binary complement of "0" at the end of the data entering operation. In this condition, all of the storage flip-flops 710–713 are in a set condition.

TRANSFERRING AN AMOUNT FROM THE SHIFT REGISTERS 104, 106 AND 108 TO THE CASH REGISTER 120

As indicated above, when the amount stored in the shift registers is to be transferred to the cash register 120, the settings of the shift registers 104, 106 and 108 are transferred to the readout registers 110, 112 and 114, and the cash register 120 is placed in operation so that the readout registers control the setting of the slides in the cash register to positions representing the stored amount. This operation is initiated by keying an entry into the input register 102 which falls within the second range of value representing the line of goods corresponding to the entered amount (see table, column 4). The register 102 transfers this entry through a converter 950 to the line of goods register and also operates a second converter 570 to supply a predetermined entry representing a listing operation to the mode of operation register 118 for all values falling within the second range.

In the illustrative example, it is assumed that the entered amount "6.36" represents the charge for an item that is classified as "meat." Assuming that the designation or entry representing "meat" is "20," the operator manually closes the keys 204 and 216 representing the binary digits "4" and "16." This forwards positive potentials to the storage capacitors 426 associated with the transistors 403 and 405. The transistors 401, 402 and 404 remain in an enabled condition. Thus, the flip-flops 406–410 in the input register 102 are conditioned to store the complement of the entry "20" by operating the flip-flops 406, 407 and 409 to their set condition while retaining the flip-flops 408 and 410 in their reset condition.

The momentary positive potential provided at the actuated keys 204 and 216 is also forwarded to a pair of the diodes 311 to render the transistor 310 nonconductive for a short period. This triggers the sequential operation of the flip-flops 320, 330, 340 and 350. When the flip-flop 320 is operated, the flip-flops 406–410 are reset to their normal condition to clear the previously stored units cents digit "6" therefrom. When the flip-flop 330 is operated to its set condition, the input transistors 401, 402, 404 operate the flip-flops 406, 407 and 409 to their set condition while the flip-flops 408 and 410 remain in their reset condition. Thus, the conductors in the cable 440 connected to the flip-flops 408 and 410 are provided with negative potentials representing the entry "20," and the conductors in the cable 450 connected to the flip-flops 408 and 410 are provided with ground and a negative potential, respectively, representing the entry "20." The marking signals applied to the conductor 440 operate the control circuit 122 so that the entry in the input register 102 is not transferred to the shift registers and so that the entries standing in the shift registers 104, 106 and 108 are transferred to the output registers 110, 112 and 114. The marking signals applied to the conductors in the cable 440 also control the operation of the converter 570 so that the input of the mode of operation register 118 is automatically provided with marking signals representing a listing operation. The marking signals applied to the conductors in the cable 450 control the converter 950 so that the line of goods register 116 is provided with marking signals representing the "meat" line of goods.

More specifically, the converter 950 comprises a diode matrix for supplying a combination of ground and negative signals to the input of the line of goods register 116 representing the entry "20." The line of goods register 116 is identical to the readout registers 110, 112 and 114, described below, in including four input transistors similar to the transistors 720–723 and four flip-flops similar to the flip-flops 710–713 connected to provide a counting circuit. The flip-flops in the register 116 provide means for storing the binary digits "1," "2," "4" and "8." Since the line of goods entries comprise the values "17"–"25" which are beyond the storage range of the register 116, the converter 950 converts the higher value entries to lower value entries capable of being stored in the register 116.

More specifically, the converter 950 comprises a matrix including a plurality of diodes 951–954, the anodes of which are connected to the conductors in the cable 450 representing the binary digits "1," "2," "4" and "8," respectively. This matrix also includes four resistors 955 connected between the cathodes of the diodes 951–954 and the conductor in the cable 450 representing the binary digit "16." The cathodes of the diodes 951–954 are also connected to four conductors extending to the base electrode circuits of four input transistors in the line of goods register 116. When the value of the entry stored in the input register 102 is "15" or less, the resistors 955 are connected to ground through the transistor 421 in the flip-flop 410 which is operated to a set condition whenever the entry has a value of "15" or less. Thus, the input transistors in the register 116 are normally supplied with a positive blocking potential when the value of the entry is in the first range of values.

In the illustrative example set forth in which the line of goods entry is "20," the flip-flop 410 is not operated to its set condition and, thus, the four resistors 955 apply a negative potential to the input transistors in the register 116. However, the value of the line of goods entry is "20," the conductor connected to the anode of the diode 953 is connected to ground. Thus, the binary "8" conductor extending to the register 116 is held at ground potential. Accordingly, the input of the register 116 is provided with negative potentials on the input conductors representing the binary digits "1," "2" and "4" and with ground potential on the conductor representing the binary digit "8." This forms the binary complement of an entry "8." Thus, the converter 950 converts the line of goods entry "20" to marking conditions representing the binary complement of the entry "8" which is applied to the input of the line of goods register 116.

As indicated above, the storage of a line of goods entry in the input register 102 marks the conductors in the cable 440 to advise the control circuit 122 that the entry in the register 102 is not to be transferred to the input register 104, that the values standing in the shift registers 104, 106 and 108 are to be transferred to the readout registers 110, 112 and 114, and that the converter 570 is to mark the mode of operation register 118 with signals representing a listing operation.

More specifically, the negative potentials supplied to the conductors of the cable 440 by the flip-flops 410 and 408 are forwarded to the base electrode of a control transistor 620 and through one of a plurality of "OR" gate diodes 612 to the base electrode of a transistor 610. The negative potential applied to the base electrode of the transistor 620 renders this transistor conductive so that the emitter of the transistor 610 is connected to ground. Thus, the negative potential forwarded through the diode 612 individual to the conductor connected to the flip-flop 408 renders the transistor 610 conductive. When the transistors 610 and 620 are placed in conduction, the negative bias for the base electrodes of the transistors 630 and 640 and a pair of transistors 650 and 680 is removed. The removal of the negative bias from the transistors 630 and 640 prevents these gates from being operated under the control of the second reset pulse and second shift pulse, respectively. Accordingly, the reset and shift pulses can not be applied to the shift registers 104, 106 and 108, and the entries previously stored therein are not cleared and are not shifted when a readout operation is performed. The removal of the negative bias from the base electrode of the transistor 650 renders this normally conductive transistor non-conductive so that a negative potential is applied to the base electrodes of a pair of gate transistors 660 and 690 to condition these transistors for operation.

It should be noted that the transistors 610 and 620 are rendered conductive to perform the functions described above whenever the value of the entry in the input register 102 is in the range of "17"–"31." Whenever the value of the entry in the register 102 is "16" or less, the operation of the control circuit 122 is not modified by the transistors 610 and 620. This is true because the transistor 620 is placed in conduction to enable the conduction of the transistor 610 only when the entry includes the binary digit "16." The entry of "16" into the input register 102 is not effective to modify this portion of the operation of the circuit 122 because the transistor 610 can only be rendered conductive when a negative input is supplied to one of the conductors in the cable 440 by one of the flip-flops 406–409 representing the binary digits "1," "2," "4" and "8." Thus, the operation of the control circuit 122 is modified in this first respect only when the entry in the input register 102 has a value in the range of "17"–"31."

The operation of the circuit 122 is also modified in accordance with whether the value of the entry stored in the input register 102 is within the range of "17"–"25" representing a line of goods entry. More specifically, the negative potential applied to the conductor in the cable 440 by the flip-flop 410 representing "16" is forwarded to the base electrode of a transistor 560 to place this transistor in conduction so that its emitter current flow biases the base electrode of a transistor 565 in a negative direction to place this transistor in conducion.

The transistor 565 is rendered conductive only when the value of the entry stored in the input register 102 is in the range of "17"–"25." This is true because the transistor 560 is rendered conductive whenever a negative potential is provided by the flip-flop 410 representing the binary digit "16." For all values less than "16," the transistor 560 remains non-conductive. Further, whenever the value of the entry in the register 102 is equal to or greater than "26," the collector electrode of the transistor 560 is shunted to ground so that the transistor 565 can not be placed in conduction.

To accomplish this, the base electrodes of a plurality of transistors 545, 550 and 555 are connected to the conductors in the cable 440 that are connected to the output of the flip-flops 407, 408 and 409. Whenever a negative potential is applied to the conductor representing the binary digit "8" and also to one or both of the conductors representing the binary digits "2" or "4," thus representing an entry equal to or greater than "26," one or both of the transistors 545 or 550 is rendered conductive to ground the emitter of the transistor 555. This causes the transistor 555 to conduct when a negative potenial is applied to the conductor representing the binary digit "8." When the transistor 555 is rendered conductive, the collector of the transistor 560 is connected to ground to prevent conduction through the transistor 565. Accordingly, the transistors 545, 550, 555 and 560 control the circuit 122 so that the transistor 565 remains nonconductive when the entries stored in the input register 102 are in the range of "1"–"15" and "26"–"31" and so that this transistor is rendered conductive when the entries stored in the input register 102 are in the range of "16"–"25."

This controlled conduction of the transistor 565 is used to modify the operation of the control circuit 122 and also to operate the converter 570 to supply a fixed entry to the mode of operation register 118 for all entries representing a line of goods. More specifically, when the transistor 565 is rendered conductive due to a line of goods entry, the potential applied to the base electrode of a transistor 675 becomes more positive so that this normally conductive transistor is rendered non-conductive. When the transistor 675 is rendered nonconductive, a negative potential is supplied to the base electrode of a gate transistor 670 to condition this transistor for conduction under the control of the second shift pulse generated by the flip-flop 350. The transistor 670 forms a gate for supplying a shift or reading pulse to the registers 110, 112, 114 and 116. Thus, when a line of goods entry is stored in the input register, the gate transistor 670 is conditioned for operation to supply a shift pulse to these registers.

As indicated above, the mode of operation register 118 controls the setting of the slide or "ruler" element in the cash register 120 that is used to select the type or mode of operation that is to be performed by the register 120 during its ensuing cycle of operation. These operations can include a total, a sub-total or a listing operation, among others. Since the storage of a line of goods entry in the input register 102 causes the transfer of the value stored in the shift registers to the cash register 120, the transistor 565 controls the converter 570 to automatically supply an entry to the mode of operation register 118 representing a listing operation whenever a line of goods entry of any value in the second range is supplied to the input register 102.

The converter 570 comprises a diode matrix including a plurality of diodes 571–578, the cathodes of which are selectively connected by four conductors in a cable 579 to the base electrode circuits of four input transistors in the mode of operation register 118, which transistors generally correspond to the transistors 720–723 in the first shift register 104. The mode of operation register 118 also includes four flip-flops similar to the flip-flops 710–713 which are connected to form a counting chain. The mode of operation register 118 is substantially identical to the first readout register 110, described below.

The converter 570 supplies marking signals to the mode of operation register 118 representing the binary complement of the number or entry that is to be stored in the register 118 for controlling the cash register 120 to perform a listing operation. Thus, when the transistor 565 is rendered conductive, the diodes 575 and 576 are forward biased to ground the input conductors to the register 118 representing the binary digits "1" and "8." The inputs representing the binary digits "2" and "4" remain at a negative potential. Thus, the input to the register 118 is provided with negative potentials marking the binary complement of the entry "9," which represents a listing operation, each time that a line of goods entry is stored in the input register 102.

Referring back to the operation of the reset and shift pulse generators, the flip-flop 340 supplies the second reset pulse after the entry "20" has been stored in the input register 102 under the control of the flip-flop 330. This reset pulse is again applied to the emitter electrode of the gating transistor 630. However, as described above, this transistor is not enabled at this time, and the shift registers 104, 106 and 108 are not reset. However, this reset signal is directly forwarded to the readout registers 110, 112 and 114, the line of goods control and register 116, and the mode of operation control and register 118 to reset these components to their normal condition.

The first readout register 110 (FIG. 8), which is identical to the registers 112, 114, 116 and 118 (FIG. 9), comprises four similar flip-flops 801–804 representing the binary numbers "1," "2," "4" and "8." These flip-flops, which are similar to the flip-flops 710–713 in the shift register 104, each include a pair of cross-coupled transistors 805 and 806 and are interconnected to form a counting chain. In the reset condition, the transistors 805 in the flip-flops 801–804 are in a conductive condition and, in the set condition, the transistors 806 in the flip-flops 801–804 are in a conductive condition. The flip-flops 801–804 are selectively set to combinations of set and reset conditions to provide a conductive pattern representing the complement of an entered digit under the control of four input transistors 810–813, the collector electrodes of which are coupled to the base electrodes of the transistors 805.

The base electrode of each of the input transistors is provided with a storage capacitor, and the storage capacitors are connected over a cable 820 to the output of the flip-flops 710–713 in the first shift register 104. Since the units cents digit "6" is now stored in complementary binary form in the register 104 by the set condition of the flip-flops 710 and 713, the capacitors associated with the input transistors 810 and 813 are provided with negative charging potentials while the capacitors associated with the base electrodes of the transistors 811 and 812 are connected to substantially ground potential. In a like manner, the input transistors in the second last readout registers 112 and 114 are connected to the outputs of the second and last shift registers 106 and 108 so that the readout registers 112 and 114 are conditioned for operation to conductive patterns representing the binary complements of the tens cents and units dollars digits stored in the shift registers 106 and 108.

Referring back to the above described operation of the flip-flop 340 to its set condition, the positive-going signal provided at the collector electrode of the transistor 342 is directly forwarded to the base electrode of a reset transistor 830 in the first readout register 110 and to the base electrode of a similar reset transistor in each of the registers 112, 114, 116 and 118. When these transistors 830 are rendered nonconductive by this positive-going pulse, all of the flip-flops in all of the registers 110, 112, 114, 116 and 118 are operated to a reset condition by a plurality of diodes 808. The flip-flop 340 now restores and the flip-flop 350 is operated.

When the flip-flop 350 is operated to its set condition, ground is forwarded from the collector of the transistor 352 to the emitter electrodes of the three transistor gates 640, 660 and 670. The transistor 640 is disabled by the conduction of the transistors 610 and 620. Therefore, a shift pulse is not transmitted to the shift registers 104, 106 and 108 and the entries standing in these registers are not transferred. However, as described above, the base electrode of the gate transistor 670 is now provided with a negative enabling potential so that the second shift pulse renders the transistor 670 conductive. The positive-going signal at the collector of the transistor 670 is forwarded to the emitter electrodes of the input transistors 810–813 in the first readout register 110 and also to the emitter electrodes of the similar input transistors in the readout registers 112 and 114 and in the line of goods register 116. The ground applied to the emitter electrodes of the input transistors 810–813 operates the flip-flops 801 and 804 to their set conditions while the flip-flops 802 and 803 remain in their reset condition. Thus, the binary complement of the units cents digit "6" is stored in the first readout register 110. In a similar manner, the binary complement of the ten cents digit "3" is stored in the second readout register 112, the binary complement of the units dollars digit "6" is stored in the third or last readout register 114, and the binary complement of the digit "8" representing a "meat" entry is stored in the line of goods register 116 under the control of the converter 950.

The positive-going second shift pulse 350 is also forwarded to the emitter electrode of the gate transistor 660 to render this transistor conductive. When the transistor 660 is rendered conductive, a positive-going signal is forwarded to the cash register 120 and to the emitter electrodes of the four input transistors in the mode of operation register 118. The ground pulse supplied to the mode of operation register 118 operates this register to store the binary complement of the digit "9," which represents a listing operation. The ground signal supplied to the cash register 120 initiates the operation thereof so that its main or control shaft moves through a single cycle of revolution during which the data stored in the registers 110, 112, 114, 116 and 118 is transferred to the cash register and is utilized in the manner represented by the stored items derived from the registers 116 and 118. The cam 902 is driven by this control shaft so that, after a time interval sufficient to transfer the information into the registers 110, 112, 114, 116 and 118, the cam 902 closes the contacts 901. This forwards a ground pulse through the diode 903 to the input of the register 118 and through the transistor 906 and the plurality of diodes 907 to the counting inputs of the registers 110, 112, 114 and 116. This ground pulse advances the counting circuits in each of these registers a single step.

In the first readout register 110, the flip-flops 801 and 804 are in a set condition and the flip-flops 802 and 803 are in a reset condition. The preliminary ground pulse applied through the diode 907 drives the base electrode of the conductive transistor 806 in a positive direction so that this transistor is rendered nonconductive and the transistor 805 in this flip-flop is rendered conductive.

The coupling capacitor connected to the base electrode of the transistor 805 in the flip-flop 802 is fully charged, while the capacitor connected to the base electrode of the transistor 806 in this flip-flop is connected to ground through the conductive transistor 805 in this flip-flop. Therefore, when the transistor 805 in the flip-flop 801 is rendered conductive, the base electrode of the transistor 805 in the flip-flop 802 is driven more positive to render this transistor nonconductive and to render the transistor 806 conductive. The flip-flop 802 is now in a set condition. Thus, the flip-flop 801 is operated to a set condition in response to the receipt of the preliminary pulse from the cash register 120. In a similar manner, all of the counting circuits in the registers 112, 114, 116 and 118 are operated a single step.

In the event that one or more of the registers is standing in a "0" representing condition in which all of the flip-flops are actuated to a set condition, the first or preliminary pulse supplied by the contacts 901 operates the counting circuit to a reset condition in which all of the flip-flops are restored to a reset condition. This supplies a positive-going signal from the "0" storing registers to the networks 905 connected to the windings 1124 in the stop assemblies 1120 so that the related "ruler" elements and the connected slide or rack elements are latched against movement. Thus, "0" is transferred from the "0" storing registers to the cash register 120 in response to the receipt of the preliminary pulse and without requiring any movement of the "ruler" elements and slides.

A suitable time interval after the preliminary pulse has been delivered by the contacts, 901, these contacts are opened by the cam 902 and the slides and "ruler" elements 1102 associated with the registers 116 and 118 are advanced in a setting direction. This results in the generation of time spaced signals which are coupled through the circuits 904 and applied to the counting inputs of these registers. These signals operate the counting circuits in the registers 116 and 118 from settings representing "meat" and a listing operation to a "0" setting in the manner set forth in detail below in conjunction with the entry of the amount. At this time, the transaction "rulers" are set to condition the register 120 to receive the stored amount. The register 120 now initiates movement of the amount "rulers" 1102 associated with the registers 110, 112 and 114. During this movement, the inputs of these registers receive a series of pulses equal to the number of steps that the amount "rulers" have been moved.

In the first readout register 110, the first ground pulse from the circuit 904 operates, the flip-flop 801 to its set condition in which the transistor 805 is nonconductive and transistor 806 is conductive. When the transistor 805 is rendered nonconductive, the coupling capacitor connected to the base electrode of the transistor 806 in the flip-flop 802 is permitted to fully charge. Thus, when the third input pulse is received, the flip-flop 801 is operated to its reset condition in which the transistor 805 is rendered conductive. When this transistor becomes conductive, the base of the transistor 806 in the flip-flop 802 is driven in a positive direction so that this transistor is rendered nonconductive and the transistor 805 in the flip-flop 802 is rendered conductive. When the transistor 805 in the flip-flop 802 is rendered conductive, the base electrode of the transistor 805 in the flip-flop 803 is driven in a positive direction so that this transistor is rendered nonconductive and the transistor 806 in the flip-flop 803 is rendered conductive. Thus, the flip flops 803 and 804 are now in a set condition and the flip-flops 801 and 802 are in a reset condition.

The application of the next two input pulses to the readout register 110 operates all of the flip-flops 801–804 to a set condition in which all of the transistors 806 are conducting. When the seventh input pulse or sixth pulse supplied from the "ruler" controlled generator is applied to the input of the register 110, all of the flip-flops 801–804 are operated to a reset condition in which all of the transistors 805 are in a conductive condition and all of the transistors 806 are in a nonconductive condition. This provides a positive-going signal which is coupled through the circuit 904 to energize the winding 1124 in the stop assembly 1120 associated with the related "ruler" element in the cash register 120. This moves the latching arm 1132 into engagement with the seventh one of the notches 1122 in the "ruler" element 1102. When the "ruler" element is blocked against further setting movement, the related control slide is also blocked against movement so that the units cents digit "6" has now been entered into the cash register 120.

In a similar manner, the remaining readout registers 112 and 114 set the slides in the related denominational orders in the cash register to the settings corresponding to the digits stored in these registers. Thus, at this time, the registers 110, 112, 114, 116 and 118 have been restored to a normal or reset condition and the related slides in the cash register 120 have been advanced to settings corresponding to the entries previously stored in these registers. The entered amount is suitable listed either during the remaining portion of the cycle of rotation of the control shaft in the cash register 120 or when the amount is originally entered.

In the event that the second amount to be entered into the cash register 120 is identical to the amount previously entered into the cash register, this identical amount can be entered into the cash register by merely operating the input device 100 to supply the proper line of goods entry to the input register 102. If the next item having a cost of "$6.36" is another item that is classified as "meat," the entry "20" is again entered into the register 102. Alternatively, if the next item having an identical amount to be entered into the register 120 is classified as a different line of goods, a different one of the entries in the range of '17"–"25" is keyed into the input register 102. This keying operation results in the storage of the entry in the input register 1102 and the subsequent transfer of the "meat" entry and the listing entry to the cash register 120 in conjunction with the amount standing in the shift registers 104, 106 and 108 in the manner described in detail above. It is possible to avoid the repeated keying of identical amounts into the data handling circuit inasmuch as the shift registers 104, 106 and 108 are not cleared during the readout operation, but only the registers 110, 112, 114, 116 and 118.

Figure 8:
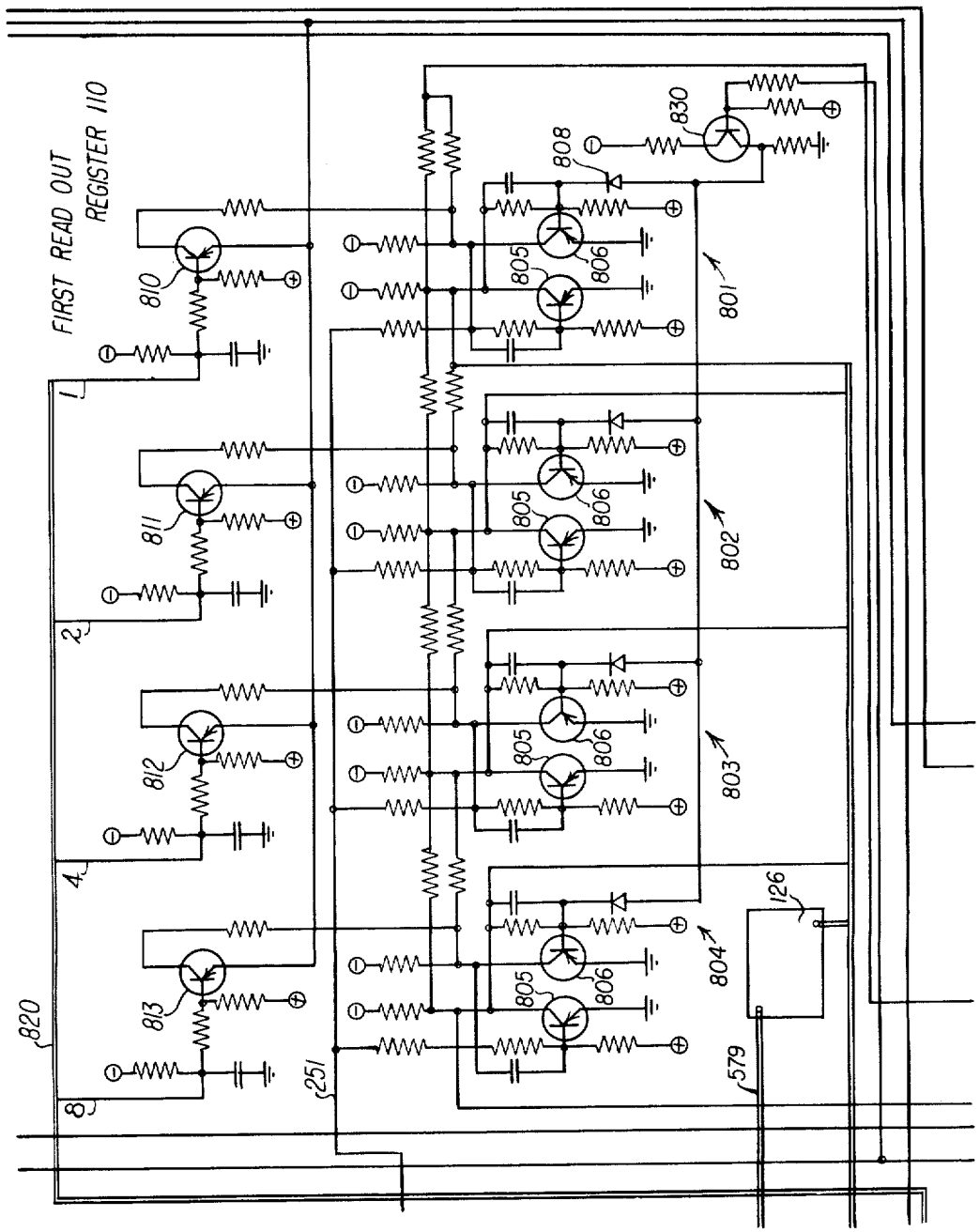

The system also includes a repetition counter 910 which is identical to the counting circuit illustrated in FIG. 8. The input of this counting chain is connected to the collector electrode of the transistor 670 so that this counter is advanced a single step each time that a shift signal is applied to the registers 110, 112 and 114. Thus, the setting of the counter 910 indicates the total number of repetitive entries that have been made of the amount standing in the shift registers 104, 106 and 108. The output of the counter 910 can be supplied to a suitable digital indicating means of any of the types well known in the art.

RESETTING MEANS

The data handling system includes means for resetting the plurality of registers to the binary complement of "0" either manually under the control of the input device 100 or automatically whenever the first digit of an amount is supplied to the input register 102 following a previous entry that does not represent an amount to be entered. By the provision of this automatically controlled means for resetting the data handling system, it is possible to provide the above described repetitive entry of a single amount into the cash register until such time as the first digit of a subsequent amount is entered into the registers.

To manually initiate a resetting operation, the input device 100 is operated by actuating the keys 201, 202, 204 and 208 to provide the correction or reset code "15." When these keys are closed, four diodes 231 forming an "AND" gate are all biased in a reverse direction so that a positive-going potential is applied to the base electrode of a normally conductive transistor 230. This renders the transistor 230 nonconductive so that its collector potential becomes more negative. This potential is applied to the base electrode of a normally nonconductive transistor 242 in a reset control flip-flop 240 to render this transistor conductive and to render a transistor 241 nonconductive so that its collector potential becomes more negative. This negative potential is applied to the base electrode of a transistor 250 to render this transistor conductive. When the transistor 250 is rendered conductive, ground is supplied over a reset conductor 251 to the registers in the data handling system.

This ground potential is applied to the base electrodes of the transistors corresponding to the transistors 716 and 805 so that all of the storage flip-flops in all of the register circuits, with the exception of the input register 102, are operated to a set condition. This clears all of the data stored in the shift registers, the readout registers, and the various control registers and sets them to the binary complement of "0." When the keys 201, 202, 204 and 208 are released, the diodes 231 forming the "AND" gate are forward biased and the transistor 230 is rendered conductive. The flip-flop 240 is monostable and, after a suitable delay, restores to its normal condition in which the transistor 242 is nonconductive and the transistor 241 is conductive. When the transistor 241 returns to a conductive state, the transistor 250 is rendered nonconductive to remove the resetting ground signal from the conductor 251.

In order to prevent the transistor 230 from being rendered nonconductive when all of the keys in the input device 100 are operated, a control transistor 220 connected to the contacts of the key 216 representing the binary digit "16" is provided. The transistor 220 is normally in a conductive condition so that its collector electrode connects the cathode of a diode 232 to substantially ground potential. However, when the contacts on the key 216 are closed, the transistor 220 is rendered nonconductive, and the diode 232 is biased in a forward direction so that the base electrode of the transistor 230 is clamped at a negative potential. This maintains the transistor 230 in a conductive state and prevents the operation of the reset flip-flop 240 when the value "31" is entered into the data handling circuit.

Since it is desirable to prevent the initiation of a cycle of operation of the shift and reset pulse generators including the flip-flops 320, 330, 340 and 350 when a correcting operation is performed, the collector of the reset transistor 250 is also connected through a diode 360 to the base electrode of the transistor 322 in the flip-flop 320. Accordingly, when the transistor 250 is rendered conductive to reset the registers, ground potential is forwarded through the diode 360 to clamp the base of the transistor 322 at ground. This ground persists until after the operated keys are released and prevents the initiation of the sequential operation of the flip-flops 320, 330, 340 and 350.

To supply means for automatically resetting the registers in this system whenever an input signal having a value in the range from "1" to "14" follows a signal having a value in the range of "17"—"31," a bistable flip-flop 260 including a pair of cross-coupled transistors 261 and 262 is provided. The base electrode of the transistor 261 is connected to the collector electrode of a transistor 680 through a diode 263, and the base electrode of the transistor 262 is connected to the collector electrode of a transistor 690 through a diode 264.

The base electrode of the transistor 680 is normally provided with an enabling potential through the resistor 611 so that each time a first shift pulse is applied to the emitter electrode of the transistor 680, this transistor is rendered conductive to apply ground potential to the anode of the diode 263. This results in a more positive potential being applied to the base electrode of the transistor 261 so that the flip-flop 260 is operated to its set condition in which the transistor 261 is nonconductive and the transistor 262 is condutcive.

If the flip-flop 260 was previously in a reset condition, in which the transistor 262 is nonconductive and the transistor 261 is in a conductive condition, the coupling capacitor connected to the base electrode of the transistor 241 in the flip-flop 240 is fully charged. Thus, when the flip-flop 260 is set and the transistor 262 is rendered conductive, the flip-flop 240 is operated to its set condition in which the transistor 241 is in a nonconductive state. This causes the transistor 250 to be placed in conduction, as described above, so that the reset signal is applied to all of the registers in the control circuit. The flip-flop 240 is monstable and restores to its reset condition at the expiration of a predetermined time interval to again render the transistor 250 nonconductive. Since the control flip-flop 260 is now in its set condition in which the transistor 261 is nonconductive, the transmission of subsequent entries having values in the range of "1"–"14" to the input register 102, althrough resulting in the application of more positive signals to the base electrode of the transistor 261, is not effective to alter the setting of the flip-flop 260.

However, whenever an entry having a value of "17" or greater is supplied by the input device 100 to the input register 102, the transistors 610 and 620 are rendered conductive so that the enabling potential is removed from the base electrode of the transistor 680. This prevents the application of signals to the base electrode of the transistor 261 in the control flip-flop 260. Further, when the transistors 610 and 620 are rendered conductive, the transistor 650 is rendered nonconductive so that an enabling potential is applied to the base electrode of the transistor 690. The emitter electrode of this transistor is connected to the first shift pulse generator. Accordingly, during the cycle of operation initiated by the storage of an entry having a value of "17" or greater, the operation of the flip-flop 330 renders the transistor 690 conductive to supply a more positive signal through the diode 264 to the base electrode of the transistor 262. This operates the flip-flop 260 to its reset condition to place the transistor 262 in a nonconductive condition and to render the transistor 261 conductive. When the transistor 262 is rendered nonconductive, the coupling capacitor connected to the base electrode of the transistor 241 is permitted to fully charge so that the next time that an operating signal is supplied through the diode 263 to the transistor 262, the control flip-flop 260 will be operated from its reset condition to its set condition. This causes the operation of the flip-flop 240 and the reset transistor 250 in the manner described above.

It should also be noted that whenever the reset flip-flop 240 is operated by the entrance of the code "15" by the input device 100, the flip-flop 240 operates the control flip-flop 260 to its set condition in which the transistor 262 is conductive and the transistor 261 is nonconductive. Thus, the flip-flop 260 must be restored to a reset condition by a following entry having a value of "17" or greater before the storage of another entry having a value of "14" or less can control the flip-flop 260 to automatically reset the system. Accordingly, the data handling system includes means for automatically resetting the registers only when an entry of the range of "1"–"14" follows an entry in the range of "17"–"31."

OPERATION OF THE SYSTEM TO CONTROL THE MODE OF OPERATION OF THE CASH REGISTER 120

As indicated above, when the mode of operation of the cash register 120 is to be controlled, as by operating this register to perform a credit operation or one in which a total or subtotal is provided, an entry in the range of "26"–"31" is entered into the input register 102 by the input device 100. This entry is transferred to the mode by the input device 100. This entry is transferred to the mode of operation register 118 by the converter 570 and is subsequently entered into the cash register 120 by setting a slide to a position individual to a desired mode of operation. The cash register is thus conditioned to perform the desired operation. If a total or subtotal is to be taken, the amount stored in the listing accumulator is read out to the registers 110, 112 and 114.

Assuming that the cash register 120 is to supply the subtotal of amounts previously entered to the registers 110, 112 and 114, the operator enters "30" by manually actuating the keys 202, 204, 208 and 216 so that the input transistors 402, 403, 404 and 405 are blocked by the positive charge accumulated on the storage capacitors 426 connected thereto. This operation of the keys in the device 100 also actuates the transistor 310 so that the flip-flops 320, 330, 340 and 350 are operated in sequence in the manner described above. When the flip-flop 320 provides the first reset pulse, the flip-flops 406–410 are reset to a normal condition under the control of the transistor 430 and, when the flip-flop 330 is operated to provide the first shift pulse, the flip-flops 407–410 are operated to a set condition and the flip-flop 406 remains in a reset condition. This provides negative signals on the conductors in the cable 440 connected to the flip-flops 407–410 and applies ground to the conductor connected to the flip-flop 406. These marking potentials form the binary complement of the subtotal entry "30."

Since the value of this entry is larger than "16," the transistors 610 and 620 are again rendered conductive to disable the gate transistors 630, 640 and 680 and to render the transistor 650 nonconductive. When the transistor 650 is rendered nonconductive, the gate transistor 660 is provided with an enabling potential. The marking potentials are also supplied to the base electrodes of the transistors 545, 550, 555 and 560. The negative potential applied to the base electrode of the transistor 560 tends to place this transistor into conduction. However, the conduction of the transistors 545, 550 and 555 provides a shunt around the collector electrode of the transistor 560 so that this unit can not be placed in operation. The transistor 565 remains in a nonconductive condition so that the transistor 675 remains in conduction to clamp the base electrode of the transistor 670 at a potential which prevents the conduction of this transistor when the second shift pulse is applied to the emitter electrode thereof. Thus, when the value of the entry in the input register 102 is in excess of "25," the operation of the control circuit 122 is modified by preventing the conduction of the transistor 670 to supply a shift pulse to the registers 110, 112, 114 and 116.

The control circuit 122 also includes means for converting the conductive pattern provided by the selectively operated flip-flops 406–410 in the input register 102 representing an entry in the range of "26"–"31" to a single marking condition which operates the converter 570 to apply an input signal to the register 118. This means includes a plurality of transistors 505, 510, 515, 520, 525, 530, 535 and 540. The transistors 515, 520, 525, 530, 535 and 540 are selectively rendered conductive to represent the codes "31," "30," 29," "28," "27" and 26," respectively. Since the entries in these ranges all have a value in excess of "25," negative potential are applied to the base electrodes of the transistors 505 and 510 so that these two transistors are placed in conduction. The conduction of the transistors 505 and 510 returns the emitters of the transistors 515, 520, 525, 530, 535, and 540 to ground to condition these transistors for operation to translate the code stored in the input register 102. Further, the provision of the enabling control provided by the transistors 505 and 510 prevents the response of these translating transistors to entries having a value less than "24."

In the illustrative example, the entry "30" is stored in the input register 102 so that negative potentials are applied not only to the conductors connected to the flip-flops 409 and 410 but also to those connected to the flip-flops 407 and 408. These potentials are effective through an "AND" gate 521 to drive the base electrode of the transistor 520 in a negative direction so that this transistor is rendered conductive. When the transistor 520 is rendered conductive, ground is applied through the diodes 573 and 574 in the converter 570 to ground the binary "1" and "2" input leads to the register 118. This provides this register with input signals forming the binary complement of "3." Thus, the original entry "30" has been converted into an entry "3" so that the function controlling slide and "ruler" element in the cash register 120 are advanced three steps to condition the cash register to supply a subtotal.

Since the subtotal is to be read out of the cash register 120 to the registers 110, 112 and 114, the preliminary pulse is not to be applied to these registers. To accomplish this, the collector electrode of the transistor 520 is connected to a point in the biasing network for the base electrode of the gate transistor 906 through a diode 522. When the transistor 520 is in its normal nonconductive state, the diode 522 is biased in a reverse direction. However, when the transistor 520 is rendered conductive by the storage of the subtotal entry "30," the diode 520 is forward biased to clamp the base of the transistor 906 at a potential that is positive with respect to its emitter. Thus, when the contacts 901 are closed, the transistor 906 can not be rendered conductive to supply pulses to the registers 110, 112, 114 and 116. A diode 517 connected to the collector of the translating transistor 515 performs the same function when the stored entry is "31" representing a total operation.

A plurality of "AND" gates 516, 526, 531, 536 and 541 connected to the base electrode circuits of the transistors 515, 525, 530, 535 and 540 selectively render these transistors conductive when the values of the entries stored in the input register 102, as represented by the negative potentials supplied to the conductors of the cable 440, are "31," "29," "28," "27," and "26." Only the outputs of the transistors 515 and 540 are shown connected to the matrix diodes 571, 572, 577 and 578 to mark the input of the register 118 with the binary complements of "6" and "5," respectively. As indicated in the preceding table, the entry "31," which is converted to "6" by the matrix 570, represents a total operation. The entry "26," which is converted to "5," is an idle code.

In order to prevent the improper operation of the converter 570 by the translating diodes 515, 520, 525, 530, 535 and 540 due to the fact that the marking conditions supplied by the cable 440 corresponding to the entry in the register 102 may include marking conditions representing codes other than that stored in the register 102, the outputs of these transistors are selectively interconnected with the inputs of others of the transistors by a plurality of diode input clamping circuits. For example, when the transistor 520 is rendered conductive, three diodes 532, 537 and 542 are biased in a forward direction so that the base electrodes of the transistors 530, 535, and 540 are held at a more positive potential to prevent these transistors from being rendered conductive. It is necessary to clamp the base electrode circuits of these transistors inasmuch as the application of the negative enabling potentials to the "AND" gate 521 also provides at least one enabling potential to the "AND" gates 531, 536 and 541 associated with the transistors 530, 535 and 540. If the diodes 532 and 542, for instance, were not provided, all three of the transistors 520, 530 and 540 would be rendered conductive when the entry "30" stored in the input register 102 is supplied to the control circuit 122.

In this regard, it should be noted that the clamping circuits are so arranged that the conduction of one of the decoding transistors representing an entry of a higher value disables the translating transistors representing entries of a lower value, which entries include an "AND" gate input that is common to the "AND" gate representing the entry actually stored in the input register 102. Thus, in the illustrative example, the transistors 520, 530 and 540 can be simultaneously rendered conductive when the entry is shifted from the input transistors 401–405 to the flip-flops 406–410. However, the outputs of the transistors 530 and 540 can not control the input to the transistor 520 so that the conduction in this latter transistor renders the transistors 530 and 540 nonconductive. In a similar manner, the outputs of the transistors 515, 525 and 535 control the input voltages applied to the base electrode circuits of the transistors representing entries of a lower value.

As indicated above, the gate transistors 640 and 670 are disabled when an entry is stored in the input register 120 having a value in the range of "26"–"31." Accordingly, the second reset pulse generator comprising the flip-flop 340 sets all of the output registers including the mode of operation register 118 to the true value of "0," and the second shift pulse generator comprising the flip-flop 350 is then operated to supply a second shift pulse. This second shift pulse renders the transistor 660 conductive so that a ground signal is supplied to only the mode of operation register 118 to cause this register to store the binary complement of "3" representing the subtotal operation of the cash register 120. The positive-going signal provided at the output of the gate transistor 660 is also forwarded over a start lead to the cash register 120 so that the control or main shaft therein begins a single cycle of revolution during which the cam 902 again momentarily closes the contacts 901 to provide the preliminary operating signals.

Since the subtotal operation causes the transfer of a subtotal from the cash register 120 to the registers 110, 112 and 114 and since the digits of this subtotal are transmitted by the register 120 in the form of a number of pulses equal to the value of each of the digits, it is desirable to have the registers 110, 112 and 114 in a true "0" setting when the pulses from the pulse generating assemblies 1104 are supplied. These registers are set to a true "0" representing condition by the second reset signal supplied by the flip-flop 340. This condition is not changed by the flip-flop 350 because the second shift pulse is not applied to the registers 110, 112 and 114 when a mode of operation entry is keyed into the system. However, if the preliminary operating signal that is used in transferring numbers into the cash register 120 is supplied during the total and subtotal operations, the amount registers would be advanced to "1" settings before the receipt of information from the cash register. Accordingly, when the contacts 901 are closed, the gate transistor 906 can not be rendered conductive to supply a preliminary pulse to the registers 110, 112 and 114 because of the clamping potential provided by the forward biased diode 522.

The closure of the contacts 901 provides a preliminary pulse to the input of the mode of operation register 118 because the subtotal entry is stored therein in a complementary binary form. This preliminary pulse advances the register 118 a single step. The transaction "rulers" 1102 are then placed in motion so that the pulse generator 1104 associated with the mode of operation register 118 supplies three additional pulses during which the "ruler" element 1102 and the slide controlled thereby advance to their third stepping position. When the mode of operation register 118 has been advanced three steps following the preliminary operating pulse, a positive-going signal is returned through the coupling network 905 to energize the winding 1124 in the mode of operation stop assembly 1120 so that further movement of the mode of operation "ruler" is arrested. At this time, the cash register 120 is conditioned to perform the subtotal operation.

The cash register 120 now moves the amount "rulers" 1102 so that the pulse generating assemblies 1104 that are connected to the registers 110, 112 and 114 each provide a number of discrete pulses equal to the number of steps that the "ruler" is moved. Each of these "rulers" is stopped by the related control device in the accumulator in the cash register 120 when the movement of the "ruler" equals the value of the proper digit of the subtotal. These pulses operate the registers 110, 112 and 114 step-by-step in the manner described above so that the manifestation or conductive pattern provided by each of these registers represents the true value of the related digit of the subtotal. This subtotal can now be recorded by the output device 126 along with the subtotal entry that is stored by the marking potentials on the conductors in the cable 579.

It should be noted that when an entry in the third range of values is stored in the input register 102, the gate transistor 680 is disabled and the transistor 690 is enabled for conduction. Thus, when the first shift pulse is supplied by the flip-flop 330, this ground pulse renders the transistor 690 conductive so that the resetting control flip-flop 260 is operated to its reset condition. Thus, if the next entry following the subtotal entry represents a digital value that is to be stored in the first shift register 104, the gate transistor 680 operates the flip-flop 260 to its set condition so that the data handling system is automatically restored to a reset condition.

Although the present invention has been described with reference to a number of embodiments thereof, it will be understood that numerous other modifications and embodiments can be provided by those skilled in the art which will fall within the spirit and scope of the principles of this invention.

What is claimed and desired to be secured by Letters Patent of the United States is:

1. A data handling system comprising a plurality of register means each adapted to store a digital entry, a common input register operable to successive settings representing the numerical values of successive digital entries, detecting means for determining the numerical values of the digital entries in the input register, control means controlled by the detecting means in accordance with the numerical values of the digital entries stored in said input register for transferring the successive digital entries stored in said input register to various ones of said plurality of register means in accordance with the numerical values thereof, utilizing means connected to at least some of said register means, and means controlled by the storage of a digital entry in a particular one of said register means for operating other ones of said register means to transfer the digital entries stored therein to said utilizing means.

2. A data handling system comprising a plurality of first register means each adapted to store a digital entry falling within a first range of values, at least one second register means adapted to store a digital entry falling within a second range of values other than said first range of values, an input register operable to successive settings representing successive digital entries of values falling within said first and second ranges, control means controlled by the values of the digital entries stored in said input register for transferring the successive digital entries stored in said input register to various ones of said first and second register means in accordance with values thereof, data utilizing means connected to said first register means, and means controlled by the storage of a digital entry in said second register means for operating said plurality of first register means to transfer the digital entries stored therein to said utilizing means.

3. A data handling system comprising a plurality of registers, a plurality of counting means, input register means operable to successive settings representing successive digital entries, means operable when a digital entry in a predetermined range of values is made in said input register means for transferring the digital entry to one of said registers, means operable when a digital entry of a value different than said range of values is made in said input register means for transferring the digital entries from one or more of said registers to one or more of said counting means, a utilizing device including a plurality of elements independently movable to different settings representing different digital entries, and means including said counting means for controlling movement of each of said elements to a setting representing the digital entry stored in one of said counting means.

4. A data handling system comprising a plurality of digital registers, input means operable to successive settings representing the numerical values of successive digital entries, signaling means for supplying control signals, first control means operable to apply said control signals to said digital registers to enable said registers to store digital entries under the control of said input means, digital entry utilizing means connected to said plurality of digital registers, and second control means for rendering said first control means ineffective and for applying said control signals to said plurality of digital registers to render said plurality of digital registers effective to control said digital entry utilizing means.

5. The system set forth in claim 4 including means for selectively operating said first and second control means in acordance with the settings in said input means.

6. A data handling system comprising a data utilizing device including a movable element adjustable to different settings representing different values of a digit, signaling means controlled by said element for generating a signal proportional to the value of the digit represented by the setting to which the element is adjusted, stop means for arresting movement of the element, register means including a plurality of controlled conduction devices, means for operating said controlled conduction devices to a pattern of conductive conditions representing the value of an entered digit, means connecting said register means to said signaling means so that said signal operates the controlled conduction devices in said register means to different patterns of conductive conditions when said element is moved, and means connecting said register means to said stop means and operable to operate said stop means when the controlled conduction devices in said register means are operated to a predetermined pattern.

7. A data handling system comprising a data utilizing device including a movable element adjustable to different settings representing different values of a digit, signaling means controlled by said element for generating a number of signals proportional to the amount that the element is moved, stop means for arresting movement of the element, counting means including a plurality of controlled conduction devices, means for operating said controlled conduction devices to a pattern of conductive conditions representing the value of an entered digit, means connecting said counting means to said signaling means so that said signals operate the controlled conduction devices in said counting means to different patterns of conductive conditions as said element is moved, and means connecting said counting means to said stop means and operable to operate said stop means when the controlled conduction devices in said counting means are operated to a predetermined pattern.

8. A data handling system comprising a data utilizing device including a plurality of independently movable elements each adjustable to different settings representing different values of a digit, signaling means controlled by each of said elements for generating a signal proportional to the value of the digit represented by the setting to which the element is adjusted, stop means for each of said elements for arresting movement of the related element, a plurality of independently operable register means each including a plurality of controlled conduction devices, means for operating said controlled conduction devices in each of said register means to a pattern of conductive conditions representing the value of an entered digit, means connecting each of said plurality of register means to one of said signaling means, means for independently moving said plurality of elements so that said signals operate the controlled conduction devices in each of said register means to different patterns of conductive conditions as said elements are moved, and means connecting each of said register means to one of said stop means so that each register means operates the connected stop means when the controlled conduction devices in the connected register means are operated to a predetermined pattern.

9. A data handling system for a cash register, comprising a plurality of first settable elements each individually movable to a position representing the value of a digit, at least one second settable element movable to a position representing an operation to be performed by said cash register, a plurality of signal generators each controlled by one of said first and second settable elements to supply a signal proportional to the degree of movement of the related settable element, a plurality of stop means each individual to one of said first and second settable elements and operable to arrest movement of the related one of the settable elements, a plurality of counting circuits each connected to one of said signal generators, said counting circuits including electronic devices operable to patterns of conductive conditions representing entered data, means connecting each of said counting circiuts to one of said stop means, first means for operating said counting circuits to conductive patterns representing the digits of an amount and representing an operation to be performed by said cash register, second means controlled by the conductive pattern representing the operation to be performed and including the signal generator and the stop means associated with said second settable element for moving said second settable element to a position representing the desired operation, and third means including the remaining counting circuits and associated signal generators and stop means for moving said plurality of first settable elements to positions in accordance with the amount represented by the conductive patterns in said remaining counting circuits.

10. In a data handling system, a first register including a plurality of bistable circuits operable to different patterns of conductive conditions to represent the values of different digits, a plurality of normally ineffective controlled conduction devices each having a control electrode connected to one of said bistable circuits in said first register to receive a control voltage representing the conductive condition of the connected bistable circuit, capacitive means connected to each of said control electrodes to store the control voltage supplied by the bistable circuit in said first register, a second register including a plurality of bistable circuits operable to different patterns of conductive conditions to represent the values of different digits, means connecting each of said controlled conduction devices to one of said bistable circuits in said second register, means for storing a selected digit in said first register by operating the bistable circuits therein to a particular pattern of conductive conditions representing the value of the stored digit, said capacitive means being supplied with control voltages in accordance with said particular pattern, and signaling means for clearing the stored digit from said first register and for rendering said plurality of controlled conduction devices effective to store said digit in said second register by operating the bistable circuits in said second register to a particular pattern of conduction conditions in accordance with the voltages stored in said capacitive means.

11. In a data handling system, a first register including a plurality of bistable circuits operable to different patterns of conductive conditions to represent the values of different digits, said bistable circuits in said first registers supplying different control potentials representing said different patterns of conductive conditions, capacitive means connected to said plurality of bistable circuits in said first register to store the control potentials supplied by the bistable circuits in said first register, a second register including a plurality of bistable circuits operable to different patterns of conductive conditions to represent the values of different digits, means connecting said capacitive means to said bistable circuits in said second register, means for storing a selected digit in said first register by operating the bistable circuits therein to a particular pattern of conductive conditions representing the value of the stored digit, said capacitive means being supplied with control potentials in accordance with said particular pattern, and signaling means for clearing the stored digit from said first register and for then rendering said plurality of bistable circuits in said second register responsive to the control potentials stored in said capacitive means so as to store said digit in said second register.

12. The system set forth in claim 11 in which a pair of second registers are provided and in which said signaling means includes means for rendering the bistable circuits in only a selected one of said second registers responsive to the control potentials stored in said capacitive means.

13. In a data handling system, a plurality of registers each including a plurality of bistable circuits, each of said registers having an input means responsive to control potentials for operating the bistable circuits therein to different patterns of conductive conditions to represent the value of an entered digit, each of said registers having an output means providing control potentials in accordance with the conductive pattern therein, capacitive means connecting the output means of each of said registers to the input means of another of said registers, said capacitive means being adapted to store the control potentials supplied at the output means of the connected registers, means for operating at least one of said registers to store a selected digit by operating the bistable circuits therein to a particular pattern of conductive conditions representing the value of the stored digit, the capacitive means being connected to the outputs of said operated registers being supplied with control potentials in accordance with the conductive patterns in the operated registers, and signaling means for clearing all of said registers and for then rendering all of said registers responsive to the control potentials stored in said capacitive means so that each register is now operated to store the digit previously stored in another register.

14. A data handling system comprising a settable element movable to different digit representing positions, a digit register including a plurality of controlled conduction devices operable to different conductive patterns representing different digits, first means controlled by the conductive pattern in said register for controlling the movement of said element to a position corresponding to the digit represented by the conductive pattern, second means including said element for operating said register to a conductive pattern corresponding to the digit represented by the movement of the element, and control means for selectively rendering said first and second means effective.

15. The system set forth in claim 14 including input means for storing digital entries, and means controlled by the value of any entry stored in said input means for operating said control means to render either said first means or said second means effective.

16. A data handling system comprising a plurality of settable elements movable to different positions representing different digits, a plurality of signal generators each controlled by one of said elements to provide a signal corresponding to the digit representing position of the element, a plurality of registers each adapted to store a digit and each individual to one of said elements, first means including said signal generators for moving said elements to positions representing digits stored in said registers, and second means including said signal generators for operating said registers to store digits corresponding to the positions of the elements.

17. A data handling system for a cash register, comprising a plurality of first settable elements each individually movable to a position representing the value of a digit, at least one second settable element movable to a position representing an operation to be performed by said cash register, a plurality of signal generators each controlled by one of said first and second settable elements to supply a signal corresponding to the setting of the related element, a plurality of registers each connected to one of said signal generators, said registers including controlled conduction devices operable to patterns of conductive conditions representing entered data, first means for operating said registers to conductive patterns representing the digits of an amount and representing an operation to be performed by said cash register, second means controlled by the conductive pattern representing the operation to be performed and including the signal generator associated with said second settable element for moving said second settable element to a position representing the desired operation, third means including the remaining registers and associated signal generators for moving said plurality of first settable elements to positions in accordance with the amount represented by the conductive patterns in said remaining counting circuits, and fourth means including the signal generators controlled by said plurality of first elements for operating the registers associated with said first elements to conductive patterns representing the digits of an amount derived from said cash register.

18. A data handling system comprising a plurality of registers, input means operable to different settings representing the numerical values of different digital entries, means controlled by said input means for sequentially storing digital entries in said plurality of registers, reset means for removing the digital entries stored in said plurality of registers, monitoring means for monitoring the numerical values of the digital entries stored in said plurality of registers, and means controlled by the monitoring means for operating said reset means when a predetermined relationship between the numerical values of successive entered digital entries is detected.

19. A data handling system comprising a plurality of registers, input means operable to different settings representing different digital entries, means controlled by said input means for sequentially storing digital entries in said plurality of registers, reset means for removing the digital entries stored in said plurality of registers, a digit utilizing device connected to said registers, first means controlled by said input means for transferring the entries stored in said registers to said digit utilizing device, means controlled by said first means for conditioning said reset means for operation, and means controlled by said input means for operating said conditioned reset means when said input means is operated to store a subsequent digital entry.

20. A data handling system comprising a data utilizing means including a plurality of differential means mechanically settable to different digit representing positions, a plurality of signal generators each controlled by one of said differential means to provide a signal representing the position of the related differential means, a data handling circuit including a plurality of register means, first means including said signal generators for operating at least some of the register means to store a data entry received from said data utilizing means, second means including said signal generators for transferring a data entry from at least some of the register means in the data handling circuit to the data utilizing means by the selective setting of the differential means, signal means for supplying a preliminary operating signal to the register means, and control means for arresting the operation of said signal means during the operation of said first means and for permitting the operation of said signal means during the operation of said second means.

21. A data handling system comprising data utilizing means including a plurality of differential means adjustable to different settings representing different data items, a plurality of signal generators each controlled by one of said differential means to provide a signal representing the setting of the selected differential means, data handling means including a plurality of register means, first means for storing a data entry in said data utilizing means by adjusting said differential means to settings representing the data entry, said first means including said signal generators and means for storing the data entry in at least some of the register means in complementary form, and second means for transferring a data entry from said data utilizing means to at least some of the register means in said data handling circuit, said second means including said signal generators for operating the register means to the actual value of the data entry.

22. The data handling system set forth in claim 21 including a separate stop means for arresting movement of each of said differential means and including a mechanism operable to engage and stop the differential means when the stop means is operated, and means connecting each of said stop means to one of said register means.

23. A data handling system comprising first data means including a plurality of differential means adjustable to different data representing settings, a plurality of signal generators each controlled by one of said differential means to provide a signal representing the setting of the related differential means, second data means including register means, first means including said signal generators for transferring a data entry represented by the settings of the differential means from the first data means to the register means in the second data means, second means including said signal generators for transferring a data entry stored in the register means of the second data means to selectively set the differential means in the first data means, and control means selectively operable to render either the first means or the second means effective to control the operation of the system.

24. The data handling system set forth in claim 23 including input means for supplying different input signals representing different operations of the system, and translating means controlled by the input signals for selectively operating said control means to select said first or second means.

25. A data handling system comprising a plurality of mechanically settable differential means movable to different positions representing different data items, a plurality of signal generators each controlled by one of said differential means to provide a series of signals corresponding to the data item representing position of the related differential means, data handling means including a plurality of registers each adapted to store a data item, first control means including said signal generators for supplying signals to said data handling means for operating at least some of the registers in the data handling means to store data items corresponding to the positions of the differential means, and second control means including said signal generators and at least some of the registers in the data handling means for moving said differential means to positions representing the data items stored in the registers.

References Cited by the Examiner

UNITED STATES PATENTS

| | | | |
|---|---|---|---|
| 2,528,394 | 10/1950 | Sharpless et al. | 235—92 |
| 2,679,975 | 6/1954 | Grosvalet et al. | 235—164 |
| 2,700,503 | 1/1955 | Crosman | 235—164 |
| 2,823,369 | 2/1958 | Haug et al. | 340—173 |
| 2,843,841 | 7/1958 | King et al. | 235—61 |
| 2,922,985 | 1/1960 | Crawford | 340—173 |
| 2,995,411 | 8/1961 | Morris et al. | 340—173 X |
| 3,084,285 | 4/1963 | Bell et al. | 235—92 X |

FOREIGN PATENTS 225,027   3/1958   Australia.

ROBERT C. BAILEY, *Primary Examiner.*

ABRAHAM BERLIN, WALTER W. BURNS, JR., MALCOLM A. MORRISON, *Examiners.*